US011065598B1

United States Patent
Ma et al.

(10) Patent No.: US 11,065,598 B1
(45) Date of Patent: Jul. 20, 2021

(54) MERCURY CAPTURE USING FUNCTIONALIZED POROUS ORGANIC POLYMER WITH HIERARCHICAL POROSITY

(71) Applicants: Shengqian Ma, Tampa, FL (US); Qi Sun, Tampa, FL (US); Briana Aguila, Tampa, FL (US)

(72) Inventors: Shengqian Ma, Tampa, FL (US); Qi Sun, Tampa, FL (US); Briana Aguila, Tampa, FL (US)

(73) Assignee: University of South Florida, Tampa, FL (US)

( * ) Notice: Subject to any disclaimer, the term of this patent is extended or adjusted under 35 U.S.C. 154(b) by 299 days.

(21) Appl. No.: 16/206,522

(22) Filed: Nov. 30, 2018

Related U.S. Application Data

(60) Provisional application No. 62/593,464, filed on Dec. 1, 2017.

(51) Int. Cl.
| | | |
|---|---|---|
| *B01J 20/22* | (2006.01) | |
| *B01J 20/28* | (2006.01) | |
| *B01J 20/30* | (2006.01) | |
| B01D 53/64 | (2006.01) | |
| C02F 1/28 | (2006.01) | |
| C02F 101/20 | (2006.01) | |

(52) U.S. Cl.
CPC ....... *B01J 20/226* (2013.01); *B01J 20/28066* (2013.01); *B01J 20/28071* (2013.01); *B01J 20/28083* (2013.01); *B01J 20/3085* (2013.01); *B01D 53/64* (2013.01); *B01D 2257/602* (2013.01); *B01D 2258/0283* (2013.01); *B01J 2220/46* (2013.01); *C02F 1/285* (2013.01); *C02F 2101/20* (2013.01)

(58) Field of Classification Search
CPC .... B01J 20/22; B01J 20/226; B01J 20/28066; B01J 20/28071; B01J 20/28083; B01J 20/3085; B01J 2220/46; B01D 53/64; B01D 2257/602; B01D 2258/0283; C02F 1/285; C02F 2101/20
USPC ....................................................... 502/402
See application file for complete search history.

(56) References Cited

U.S. PATENT DOCUMENTS

2014/0050641 A1\* 2/2014 Ergang .................. B01D 53/80
423/210

\* cited by examiner

*Primary Examiner* — Edward M Johnson
(74) *Attorney, Agent, or Firm* — Thomas|Horstemeyer, LLP

(57) ABSTRACT

Compositions are provided for binding mercury based in porous organic polymers having (i) a plurality of repeat units having heavy metal chelator moieties covalently attached thereto and (ii) a plurality of pores having a hierarchical pore size distribution over a range of pore sizes. In some aspects, the range of pore sizes is about 5 nm to 10 nm. The compositions can have a maximum mercury uptake capacity of 1,000 mg g$^{-1}$ to 2,000 mg g$^{-1}$ at 1 atm and 296 K and has a mercury uptake capacity that is stable and recyclable. Methods of making the compositions and methods of using the compositions for uptake of mercury are also provided.

17 Claims, 21 Drawing Sheets

US 11,065,598 B1

MERCURY CAPTURE USING FUNCTIONALIZED POROUS ORGANIC POLYMER WITH HIERARCHICAL POROSITY

CROSS-REFERENCE TO RELATED APPLICATIONS

This application claims priority to, and the benefit of, U.S. provisional application entitled "MERCURY CAPTURE USING FUNCTIONALIZED POROUS ORGANIC POLYMER WITH HIERARCHICAL POROSITY" having Ser. No. 62/593,464, filed Dec. 1, 2017, the contents of which are incorporated by reference in their entirety.

TECHNICAL FIELD

The present disclosure generally relates to porous materials.

BACKGROUND

Rapid industrial progress has become a byproduct of the recent advances in technology and the competitive nature of the research community. However, such innovations come with adverse effects as the growth of industry, with more coal-powered fuel stations and waste incinerators, consequently increases the release of toxic heavy metals into the environment.[1] Mercury, $Hg^0$ and $Hg^{2+}$, is one of the most hazardous heavy metals being reported with more than 6,000 tons emitted into the atmosphere per year.[2] Mercury is uniquely dangerous due to the natural processes that convert the organic and inorganic forms of mercury into its highly volatile elemental form. This creates a constant cycle of mercury entering and reentering the atmosphere, soil, and water, ultimately accumulating in our food supply as methylmercury, a potent neurotoxin.[3] Mercury exposure is the cause of many serious health issues for humans, including damage to the nervous system and lungs; also of concern are potential birth defects in expectant mothers after exposure.[4] The threat of mercury has become a global issue that has warranted intervention, with the Minamata Convention recently held to forge an agreement to reduce emissions from common anthropogenic sources such as coal burning, cement production, oil refining, and artisanal and small-scale gold mining.[5] Until the emissions can be greatly reduced, it is imperative to develop new technologies to decrease the mercury found in the atmosphere and industrial wastewater run-off.

The immediate need for remediation of toxic metals has spurred research interest in the field of materials design.[6] Preliminary methods like ion-exchange resins were explored but were found to be expensive and ineffective.[7] Further research employed the strong soft-soft interactions between the thiol group and mercury,[8] and much work has been done on thiol-functionalized adsorbent materials including clays,[9] activated carbon,[10] mesoporous silica,[11] cross-linked polyethyleneimine,[12] and others.[13] However, these materials display low surface areas, small pore sizes, and a low density of functional groups. Metal-organic frameworks (MOFs) and covalent organic frameworks (COFs) offer an amenable design strategy to create a high density of chelating sites with promising uptake capacities, but suffer from stability issues which inhibits their use in a wide range of conditions.[8b, 14] These limitations have necessitated the exploration of new adsorbent materials to enhance mercury capture and to create a viable option for real-world applications.

There remains a need for materials that overcome the aforementioned deficiencies.

SUMMARY

In various aspects, compositions for binding mercury are provided that overcome one or more of the aforementioned deficiencies. In some aspects, the compositions include a porous organic polymer (POP) having both (i) a plurality of repeat units having a structure according to the formula —$CH_2A^1CH_2$— where $A^1$ is a conjugated core having one or more heavy metal chelator moieties covalently attached thereto; and (ii) a plurality of pores having a hierarchical pore size distribution over a range of pore sizes. $A^1$ can be, for instance, a substituted phenyl, substituted biphenyl, substituted terphenyl, substituted naphthalene, or substituted anthracene.

In some aspects, the composition includes a porous organic polymer (POP) having both (i) a plurality of repeat units each having a structure according to any one of Formula 1A-Formula 1C, and (ii) a plurality of pores having a hierarchical pore size distribution over a range of pore sizes.

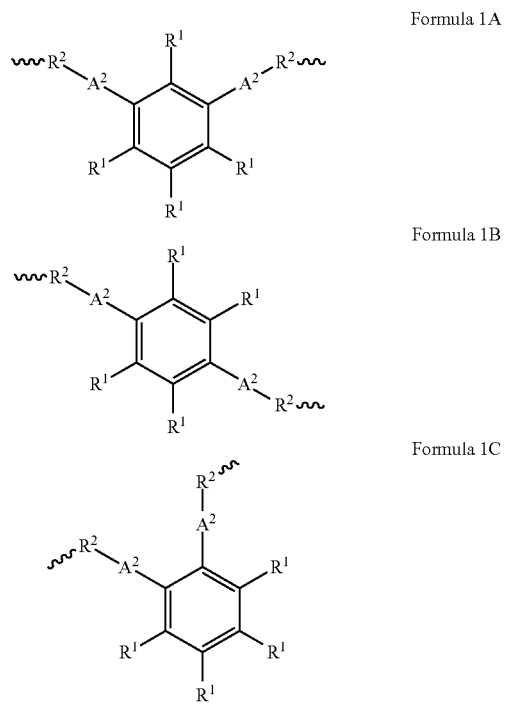

Formula 1A

Formula 1B

Formula 1C

Each occurrence of $R^1$ can be independently —$R^3A^3$, a hydrogen, or an alkyl or heteroalkyl having 1 to 3 carbon atoms so long as at least one occurrence of $R^1$ is —$R^3A^3$; where each occurrence of $R^2$ is independently an alkyl having 1 to 3 carbon atoms; where each occurrence of $R^3$ is independently none or a substituted or unsubstituted alkyl or heteroalkyl having 1 to 5 carbon atoms; where each occurrence of $A^2$ is independently none or a substituted or unsubstituted phenyl; and where each occurrence of $A^3$ is a heavy metal chelator moiety. The heavy metal chelator moiety can include, for example, a thiol, a sulfide, an amine, or a pyridine moiety.

The composition can have a range of pore sizes, and in particular can have a hierarchical pore size distribution. The range of pore sizes can be about 1 nm to 10 nm, about 1 nm to 8 nm, about 1 nm to 5 nm, or about 5 nm to 10 nm. The hierarchical pore size distribution can be determined based upon at least 60% of the pore sizes in the range of pore sizes having a pore volume of at least 0.01 cm$^3$ g$^{-1}$ in the pore size distribution, wherein the pore size distribution is based on a non-local density functional theory model applied to a nitrogen adsorption isotherm for the POP measured at 77 K. In some aspects, the range of pore sizes is about 1 nm to about 10 nm; and at least 80% of the pore sizes in the pore size distribution have a pore volume of at least 0.01 cm$^3$ g$^{-1}$.

Methods of making the compositions are also provided. The methods can include forming a mixture comprising a precursor monomer and a free radical initiator in an aprotic solvent, wherein the precursor monomer has a structure according to the formula CH$_2$=CHA$^1$CH=CH$_2$ where A$^1$ is a conjugated core having one or more halide moieties covalently attached thereto; heating the mixture to a first elevated temperature for a first period of time to form the porous organic polymer having halide moieties covalently attached thereto; substituting the halide moieties with heavy metal chelator moieties to form the porous organic polymer having one or more heavy metal chelator moieties covalently attached thereto. The methods can include substituting the halide moieties with heavy metal chelator moieties via nucleophilic aromatic substitution with a salt of the heavy metal chelator moiety.

Other systems, methods, features, and advantages of compositions and methods will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 1B) pore size distribution of POP-SH, calculation based on NLDFT; (FIG. 1C) SEM image of POP-SH (scale bar 1 um); and (FIG. 1D) TEM image of POP-SH (scale bar 100 nm).

(FIG. 3B) adsorption curve of Hg$^{2+}$ versus contact time in aqueous solution using POP-SH. Inset shows the pseudo-second-order kinetic plot for the adsorption; (FIG. 3C) comparison of Hg$^{2+}$ saturation uptake amount and Kd value for POP-SH with other benchmark porous materials, PAF-1-SH,[16] LHMS-1,[13h] FMMS,[11f] Chalcogel-1,[13i] S-FMC-900,[11b] Zr-DMBD,[14e] KMS-1,[13j] COF-SH[14f], W-DR-N-MoS$_2$,[13f] H$_{1.45}$Na$_{0.45}$InS$_{2.45}$,[13g] TAPB-BMTTPA-COF.[14h] and (FIG. 3D) concentrations of metal ions after the breakthrough experiment with POP-SH, collected at 4 mL intervals. The initial concentration of various metals is approximately 5 ppm.

(FIG. 4B) EXAFS spectrum of POP-SH in k-space fit (black trace) with two Hg—S scattering paths. Dashed lines indicate the fit window.

DETAILED DESCRIPTION

Figure 1A:
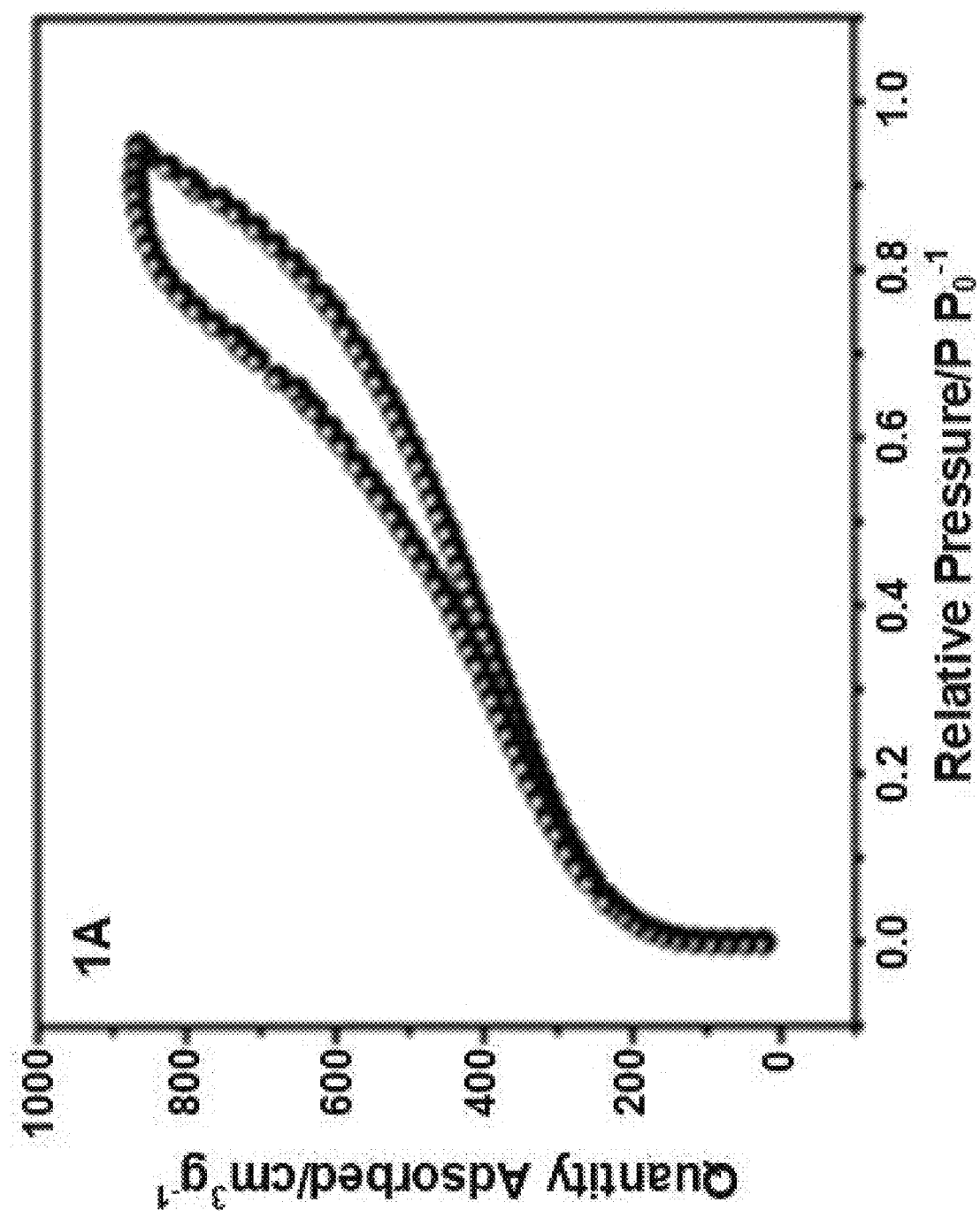
FIGS. 1A-1D show (FIG. 1A) nitrogen sorption isotherms of POP-SH collected at 77 K with Brunauer-Emmett-Teller (BET) surface area calculated to be 1061 m$^2$ g$^{-1}$.

Taking the aforementioned challenges into account, the use of porous organic polymers (POPs) has been investigated as a promising adsorbent for heavy metal decontamination. POPs are a burgeoning class of porous material, which offer structural diversity, tunable pore size, high surface area, and chemical stability.[15] Pioneering work done using a functionalized POP (PAF-1-SH) set the standard as a stable material for effective mercury decontamination; however, stoichiometric amounts of catalyst are required for the synthesis of the PAF-1 framework and a multi-step post-synthetic modification is required, contributing to the impracticality in large-scale applications. In addition, the resulting material is microporous, which may lower the efficiency of wastewater treatment.[16] To add applicability of the adsorbent material, there is a need for a cost-effective and simple method to synthesize a hierarchical porous organic polymer with a high density of chelating sites.

To tackle these challenges a de novo strategy and a free radical polymerization method with readily available reagents is utilized to make a thiol functionalized POP, namely POP-SH. Using this method gives rise to an exceptionally high density of available chelating sites and it was found it to have a high saturation uptake capacity of over 600 and 1200 mg g$^{-1}$ (with an equilibrium concentration of 200 ppm) for Hg$^0$ and Hg$^{2+}$, respectively. The material was discovered to have rapid kinetics, reaching ppb level within ten minutes. Additionally, POP-SH was fully recyclable, stable at different pH values, and selective for mercury in the presence of other cations. This work reveals the promise of POPs as an adsorbent for mercury removal and potentially many other toxic metals detrimental to the environment.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

DEFINITIONS

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The terms "pore diameter" and "pore size", as used interchangeably herein, refer to a measure of the effective diameter of the pores in the composition. The pore diameter can be the effective diameter of the largest gas molecule that can pass through the majority of the pores in the composition. The pore diameter can be estimated from the average pore diameter obtained from crystallographic measurements. The pore diameter can be estimated from measured adsorption isotherms for an inert gas such as $N_2$ or Ar using non-local density functional theory (NLDFT) or using models such as the Horvath-Kawazoe model.

The term "porous organic polymer (POP)", as used herein, refers generally to high surface area materials formed from organic segments covalently bonded to form an extended porous structure. Porous organic polymers can include conjugated microporous polymers, porous aromatic frameworks, porous polymer networks, and porous organic frameworks. The porous organic polymer can be crystalline, semi-crystalline, or amorphous. The porous organic polymer can have a surface greater than about 20 $m^2/g$, 50 $m^2/g$, 100 $m^2/g$, 500 $m^2/g$, or greater than about 1,000 $m^2/g$. The porous organic polymer can have a surface area up to about 8,000 $m^2/g$, 7,000 $m^2/g$, 6,000 $m^2/g$, 5,000 $m^2/g$, or 4,000 $m^2/g$. As used herein, the term "porous organic polymer" does not include zeolite structures or mesoporous silica structures.

The term "stable", as used herein, refers to compositions that are stable over time, stable under aqueous conditions, stable under harsh conditions, stable under acidic conditions, and/or stable under basic conditions. A composition is stable over time when, under standard operating conditions such as elevated temperatures and/or pressures, the composition does not change pore size by more than 1%, 2%, 5%, or 10% and/or does not change maximum metal uptake capacity by more than 1%, 2%, 5%, or 10% for a period of at least 1, 2, 10, 20, or 30 days. A composition is stable under harsh conditions when the composition does not change pore size by more than 1%, 2%, 5%, or 10% after exposure to boiling water for at least 2, 3, 4, 5, or 6 hours. A composition is stable under harsh conditions when the composition has a distribution coefficient of the heavy metal that is greater than $1\times10^6$ mL $g^{-1}$, greater than $5\times10^6$ mL $g^{-1}$, greater than $1\times10^7$ mL $g^{-1}$, or greater than $2\times10^7$ mL $g^{-1}$ both under acidic conditions of pH less than 3.0, 2.0, or 1.0 and under basic conditions of pH great than 10.0, 11.0, or 12.0. A composition is stable under aqueous conditions when it does not change pore size by more than 1%, 2%, 5%, or 10% and/or does not change maximum metal uptake capacity by more than 1%, 2%, 5%, or 10% after being exposed to an air environment with at least 60%, at least 70%, at least 80%, or at least 90% relative humidity for at least 12 hours or for at least 1, 2, 3, 4, 5, or 10 days. A composition is stable under basic conditions when it does not change pore size by more than 1%, 2%, 5%, or 10% and/or does not change maximum metal uptake capacity by more than 1%, 2%, 5%, or 10% after exposure to concentrated NaOH solution, e.g. at least 1.0 M, 2.0M, 3.0 M, or 6.0 M NaOH, for a period of at least 120 minutes. A composition is stable under acid conditions when it does not change pore size by more than 1%, 2%, 5%, or 10% and/or does not change maximum metal uptake capacity by more than 1%, 2%, 5%, or 10% after exposure to concentrated HCl solution, e.g. at least 1.0 M, 2.0M, 3.0 M, or 6.0 M HCl, for a period of at least 120 minutes.

The term "small molecule", as used herein, generally refers to an organic molecule that is less than about 2,000 g/mol in molecular weight, less than about 1,500 g/mol, less than about 1,000 g/mol, less than about 800 g/mol, or less than about 500 g/mol. Small molecules are non-polymeric and/or non-oligomeric.

The term "derivative" refers to any compound having the same or a similar core structure to the compound but having at least one structural difference, including substituting, deleting, and/or adding one or more atoms or functional groups. The term "derivative" does not mean that the derivative is synthesized from the parent compound either as a starting material or intermediate, although this may be the case. The term "derivative" can include salts, prodrugs, or metabolites of the parent compound. Derivatives include compounds in which free amino groups in the parent compound have been derivatized to form amine hydrochlorides, p-toluene sulfoamides, benzoxycarboamides, t-butyloxycarboamides, thiourethane-type derivatives, trifluoroacetylamides, chloroacetylamides, or formamides. Derivatives include compounds in which carboxyl groups in the parent compound have been derivatized to form salts, methyl and ethyl esters or other types of esters or hydrazides. Derivatives include compounds in which hydroxyl groups in the parent compound have been derivatized to form O-acyl or O-alkyl derivatives. Derivatives include compounds in which a hydrogen bond donating group in the parent compound is replaced with another hydrogen bond donating group such as OH, NH, or SH. Derivatives include replacing a hydrogen bond acceptor group in the parent compound with another hydrogen bond acceptor group such as esters, ethers, ketones, carbonates, tertiary amines, imine, thiones, sulfones, tertiary amides, and sulfides.

The terms "reactive coupling group" and "reactive functional group" are used interchangeably herein to refer to any chemical functional group capable of reacting with a second functional group under the given conditions to form a covalent bond. Those skilled in the art will recognize that some functional groups may react under certain conditions but not under others. Accordingly, some functional groups may be reactive coupling groups only certain conditions, e.g. under conditions where the groups react to form a covalent bond. The selection of reactive coupling groups is within the ability of the skilled artisan. Examples of reactive coupling groups can include primary amines ($-NH_2$) and amine-reactive linking groups such as isothiocyanates, isocyanates, acyl azides, NHS esters, sulfonyl chlorides, aldehydes, glyoxals, epoxides, oxiranes, carbonates, aryl halides, imidoesters, carbodiimides, anhydrides, and fluorophenyl esters. Most of these conjugate to amines by either acylation or alkylation. Examples of reactive coupling groups can include aldehydes (—COH) and aldehyde reactive linking groups such as hydrazides, alkoxyamines, and primary amines. Examples of reactive coupling groups can include thiol groups (—SH) and sulfhydryl reactive groups such as maleimides, haloacetyls, and pyridyl disulfides. Examples of reactive coupling groups can include photoreactive coupling groups such as aryl azides or diazirines. Examples of reactive coupling groups can include click reactive coupling groups capable of forming covalent bonds through click reactions. Well-known reactions include the hetero-Diels-Alder reaction, the thiol-ene coupling, the Staudinger ligation, native chemical ligation, and the amidation reaction between thio acids or thio esters and sulfonyl azides (referred to as 'sulfo-click'). As used herein, the terms "sulfo-click" and "sulfo-click chemistry" are used to refer to a reaction between thio acids and sulfonyl azides containing molecules, creating a covalent bonds between the two molecules. Examples of sulfa-click chemistry are described in U.S. Patent Application Publication 2011/0130568 and PCT Publication WO 2012/021486. The coupling reaction may include the use of a catalyst, heat, pH buffers, light, or a combination thereof.

The term "alkyl" refers to the radical of saturated aliphatic groups (i.e., an alkane with one hydrogen atom removed), including straight-chain alkyl groups, branched-chain alkyl groups, cycloalkyl (alicyclic) groups, alkyl-substituted cycloalkyl groups, and cycloalkyl-substituted alkyl groups.

In preferred embodiments, a straight chain or branched chain alkyl has 30 or fewer carbon atoms in its backbone (e.g., $C_1$-$C_{30}$ for straight chains, and $C_3$-$C_{30}$ for branched chains), preferably 20 or fewer, more preferably 15 or fewer, most preferably 10 or fewer. Likewise, preferred cycloalkyls have 3-10 carbon atoms in their ring structure, and more preferably have 5, 6, or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, phosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, more preferably from one to six carbon atoms in its backbone structure. Likewise, "lower alkenyl" and "lower alkynyl" have similar chain lengths. Throughout the application, preferred alkyl groups are lower alkyls. In preferred embodiments, a substituent designated herein as alkyl is a lower alkyl.

It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), $-CF_3$, $-CN$ and the like. Cycloalkyls can be substituted in the same manner.

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

The term "alkylthio" refers to an alkyl group, as defined above, having a sulfur radical attached thereto. In preferred embodiments, the "alkylthio" moiety is represented by one of —S— alkyl, —S-alkenyl, and —S-alkynyl. Representative alkylthio groups include methylthio, ethylthio, and the like. The term "alkylthio" also encompasses cycloalkyl groups, alkene and cycloalkene groups, and alkyne groups. "Arylthio" refers to aryl or heteroaryl groups. Alkylthio groups can be substituted as defined above for alkyl groups.

The terms "alkenyl" and "alkynyl", refer to unsaturated aliphatic groups analogous in length and possible substitution to the alkyls described above, but that contain at least one double or triple bond respectively.

The terms "alkoxyl" or "alkoxy" as used herein refers to an alkyl group, as defined above, having an oxygen radical attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, and —O-alkynyl. The terms "aroxy" and "aryloxy", as used interchangeably herein, can be represented by —O-aryl or O-heteroaryl, wherein aryl and heteroaryl are as defined below. The alkoxy and aroxy groups can be substituted as described above for alkyl.

The terms "amine" and "amino" (and its protonated form) are art-recognized and refer to both unsubstituted and substituted amines, e.g., a moiety that can be represented by the general formula:

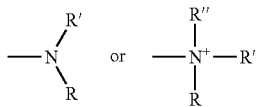

wherein R, R', and R" each independently represent a hydrogen, an alkyl, an alkenyl, —(CH$_2$)$_m$—R$_C$ or R and R' taken together with the N atom to which they are attached complete a heterocycle having from 4 to 8 atoms in the ring structure; R$_C$ represents an aryl, a cycloalkyl, a cycloalkenyl, a heterocycle or a polycycle; and m is zero or an integer in the range of 1 to 8. In preferred embodiments, only one of R or R' can be a carbonyl, e.g., R, R' and the nitrogen together do not form an imide. In still more preferred embodiments, the term "amine" does not encompass amides, e.g., wherein one of R and R' represents a carbonyl. In even more preferred embodiments, R and R' (and optionally R") each independently represent a hydrogen, an alkyl or cycloakly, an alkenyl or cycloalkenyl, or alkynyl. Thus, the term "alkylamine" as used herein means an amine group, as defined above, having a substituted (as described above for alkyl) or unsubstituted alkyl attached thereto, i.e., at least one of R and R' is an alkyl group The term "amido" is art-recognized as an amino-substituted carbonyl and includes a moiety that can be represented by the general formula:

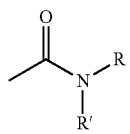

wherein R and R' are as defined above.

"Aryl", as used herein, refers to C$_5$-C$_{10}$-membered aromatic, heterocyclic, fused aromatic, fused heterocyclic, biaromatic, or bihetereocyclic ring systems. Broadly defined, "aryl", as used herein, includes 5-, 6-, 7-, 8-, 9-, and 10-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine, pyrimidine, and the like. Those aryl groups having heteroatoms in the ring structure may also be referred to as "aryl heterocycles" or "heteroaromatics". The aromatic ring can be substituted at one or more ring positions with one or more substituents including, but not limited to, halogen, azide, alkyl, aralkyl, alkenyl, alkynyl, cycloalkyl, hydroxyl, alkoxyl, amino (or quaternized amino), nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF$_3$, —CN, and combinations thereof.

The term "aryl" also includes polycyclic ring systems having two or more cyclic rings in which two or more carbons are common to two adjoining rings (i.e., "fused rings") wherein at least one of the rings is aromatic, e.g., the other cyclic ring or rings can be cycloalkyls, cycloalkenyls, cycloalkynyls, aryls and/or heterocycles. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1, 5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4 oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl. One or more of the rings can be substituted as defined above for "aryl".

The term "aralkyl", as used herein, refers to an alkyl group substituted with an aryl group (e.g., an aromatic or heteroaromatic group).

The term "aralkyloxy" can be represented by —O-aralkyl, wherein aralkyl is as defined above.

The term "carbocycle", as used herein, refers to an aromatic or non-aromatic ring(s) in which each atom of the ring(s) is carbon.

"Heterocycle" or "heterocyclic", as used herein, refers to a monocyclic or bicyclic structure containing 3-10 ring atoms, and preferably from 5-6 ring atoms, consisting of carbon and one to four heteroatoms each selected from the group consisting of non-peroxide oxygen, sulfur, and N(Y) wherein Y is absent or is H, O, ($C_1$-$C_{10}$) alkyl, phenyl or benzyl, and optionally containing 1-3 double bonds and optionally substituted with one or more substituents. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxepanyl, oxetanyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydropyranyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl. Heterocyclic groups can optionally be substituted with one or more substituents at one or more positions as defined above for alkyl and aryl, for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The term "carbonyl" is art-recognized and includes such moieties as can be represented by the general formula:

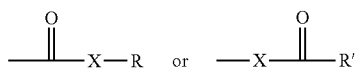

wherein X is a bond or represents an oxygen or a sulfur, and R and R' are as defined above. Where X is an oxygen and R or R' is not hydrogen, the formula represents an "ester". Where X is an oxygen and R is as defined above, the moiety is referred to herein as a carboxyl group, and particularly when R is a hydrogen, the formula represents a "carboxylic acid". Where X is an oxygen and R' is hydrogen, the formula represents a "formate". In general, where the oxygen atom of the above formula is replaced by sulfur, the formula represents a "thiocarbonyl" group. Where X is a sulfur and R or R' is not hydrogen, the formula represents a "thioester." Where X is a sulfur and R is hydrogen, the formula represents a "thiocarboxylic acid." Where X is a sulfur and R' is hydrogen, the formula represents a "thioformate." On the other hand, where X is a bond, and R is not hydrogen, the above formula represents a "ketone" group. Where X is a bond, and R is hydrogen, the above formula represents an "aldehyde" group.

The term "heteroatom" as used herein means an atom of any element other than carbon or hydrogen. Preferred heteroatoms are boron, nitrogen, oxygen, phosphorus, sulfur, and selenium. Other heteroatoms include silicon and arsenic.

As used herein, the term "nitro" means —$NO_2$; the term "halogen" designates —F, —Cl, —Br, or —I; the term "sulfhydryl" means —SH; the term "hydroxyl" means —OH; and the term "sulfonyl" means —$SO_2$—.

The term "substituted" as used herein, refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, amino acid, peptide, and polypeptide groups.

Heteroatoms such as nitrogen may have hydrogen substituents and/or any permissible substituents of organic compounds described herein which satisfy the valences of the heteroatoms. It is understood that "substitution" or "substituted" includes the implicit proviso that such substitution is in accordance with permitted valence of the substituted atom and the substituent, and that the substitution results in a stable compound, i.e., a compound that does not spontaneously undergo transformation such as by rearrangement, cyclization, elimination, etc.

Porous Organic Polymers

Compositions are provided including a porous organic polymer (POP) having a hierarchical porosity that can provide for strong mercury adsorption when the polymer is functionalized with heavy metal chelator moieties. The POP can have a plurality of pores having a hierarchical pore size distribution over a range of pore sizes. In some aspects, the range of pore sizes is at least 5 nm, at least 8 nm, or at least 10 nm. In some aspects, the range of pore sizes is 5 nm wide, e.g. about 0.5 nm to 5.5 nm, about 1.0 nm to 6.0 nm, about 1.5 nm to 6.5 nm, about 2 nm to 7 nm, about 3 nm to 8 nm, about 4 nm to 9 nm, or about 5 nm to 10 nm. In some aspects, the range of pore sizes is 8 nm wide, e.g. about 0.5 nm to 8.5 nm, about 1.0 nm to 9.0 nm, about 1.5 nm to 9.5 nm, or about 2 nm to 10 nm. In some aspects, the range of pore sizes is 10 nm wide, e.g. about 0 nm to 10 nm or about 0.5 nm to 10.5 nm. In some aspects, the range of pore sizes is about 1 nm to 10 nm, about 1 nm to 8 nm, about 1 nm to 5 nm, or about 5 nm to 10 nm.

The hierarchical pore size distribution can be determined based upon a pore size distribution determined via non-local density functional theory or the Horvath-Kawazoe model using adsorption isotherms for an inert gas such as $N_2$ or Ar.

In some aspects, the hierarchical pore size distribution is determined based upon at least 40%, at least 50%, at least 60%, at least 70%, or at least 80% of the pore sizes in the range of pore sizes having a pore volume of at least 0.005 cm$^3$ g$^{-1}$, at least 0.01 cm$^3$ g$^{-1}$, or at least 0.015 cm$^3$ g$^{-1}$ in the pore size distribution. The pore size distribution can be based on a non-local density functional theory model applied to a nitrogen adsorption isotherm for the POP measured at about 77 K. In some aspects, the range of pore sizes is about 1 nm to about 10 nm; and at least 80% of the pore sizes in the pore size distribution have a pore volume of at least 0.01 cm$^3$ g$^{-1}$.

The composition can have a maximum mercury uptake capacity of 1,000 mg g$^{-1}$ to 2,000 mg g$^{-1}$, 1,200 mg g$^{-1}$ to 2,000 mg g$^{-1}$, or 1,200 mg g$^{-1}$ to 1,500 mg g$^{-1}$ at 1 atm and 296 K. The composition can have a distribution coefficient for mercury of about 1×10$^8$ mL g$^{-1}$ to 1×10$^9$ mL g$^{-1}$ or about 1.5×10$^8$ mL g$^{-1}$ to 1×10$^9$ mL g$^{-1}$. In some aspects, the composition attains at least 80%, at least 85%, at least 90%, or at least 95% of the equilibrium adsorption capacity in less than 10 minutes when placed in an aqueous solution containing the mercury. In some aspects, the composition has a mercury uptake capacity that is stable and recyclable. The POP can be stabled under basic conditions, acidic conditions, or both. The porous organic polymer can have a surface area from 1,000 m$^2$/g to 8,000 m$^2$/g, from 1,000 m$^2$/g to 5,000 m$^2$/g, or from 1,200 m$^2$/g to 3,000 m$^2$/g.

The POP can include a plurality of repeat units having a structure according to the formula —CH$_2$A$^1$CH$_2$— where A$^1$ is a conjugated core having one or more heavy metal chelator moieties covalently attached thereto. In some aspects, A$^1$ includes from 1 to 3 substituted phenyl rings that can be fused or non-fused. A$^1$ can include substituted phenyl, substituted biphenyl, substituted terphenyl, substituted naphthalene, or substituted anthracene.

The POP can include a plurality of repeat units each having a structure according to any one of Formula 1A-Formula 1C

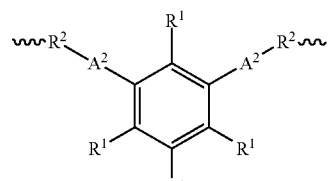

Formula 1A

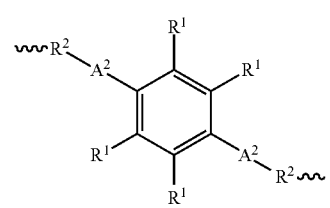

Formula 1B

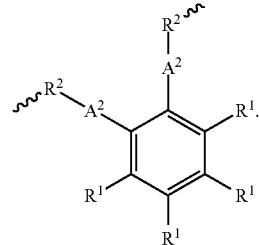

Formula 1C

Each occurrence of R$^1$ can independently be —R$^3$A$^3$, a hydrogen, or an alkyl or heteroalkyl having 1, 2, 3, 4, or 5 carbon atoms so long as at least one occurrence of R$^1$ is —R$^3$A$^3$. Each occurrence of R$^2$ can independently be an alkyl having 1 to 12, 1 to 5, or 1 to 3 carbon atoms. Each occurrence of R$^3$ can independently be none or a substituted or unsubstituted alkyl or heteroalkyl having 1, 2, 3, 4, or 5 carbon atoms. Each occurrence of A$^2$ can independently be none or a substituted or unsubstituted phenyl. Each occurrence of A$^3$ is a heavy metal chelator moiety.

In some aspects, the repeat units in the plurality of repeat units have a structure according to one of Formula 2A-Formula 2C.

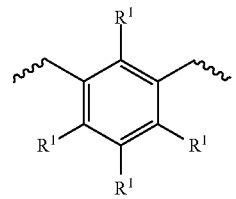

Formula 2A

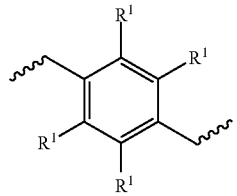

Formula 2B

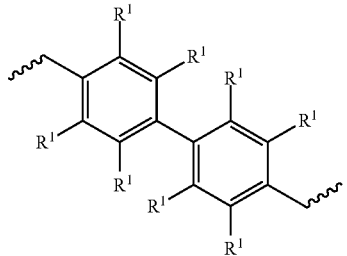

Formula 2C

The heavy metal chelator moieties can a thiol, a sulfide, an amine, a pyridine moiety, or a combination thereof. In some aspects, the repeat units in the plurality of repeat units each have a structure according to the following formula

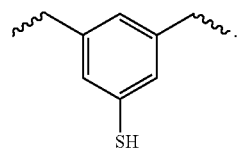

Method of Making Porous Organic Polymers

A variety of methods are provided for making the compositions described herein. The methods can provide efficient and cost-effective methods for making POPs for mercury uptake that have a hierarchical porosity. In some aspects, the methods include free-radical polymerization of a divinyl aryl halide to form the porous organic polymer having halide moieties covalently attached thereto. The halide moieties can be substituted, for example via nucleophilic aromatic substitution, to covalently attach the metal chelator moieties to the POP.

In some aspects, the method includes forming a mixture comprising a precursor monomer and a free radical initiator in an aprotic solvent. The precursor monomer can have a structure according to the formula CH$_2$=CHA$^1$CH=CH$_2$ where A$^1$ is a conjugated core having one or more halide moieties covalently attached thereto. The precursor monomer can have a structure according to any one of Formula 3A-Formula 3C.

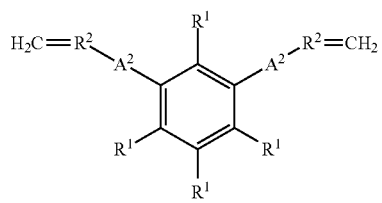

Formula 3A

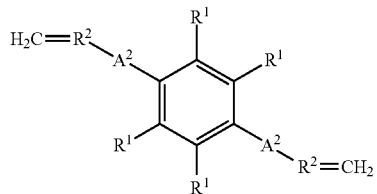

Formula 3B

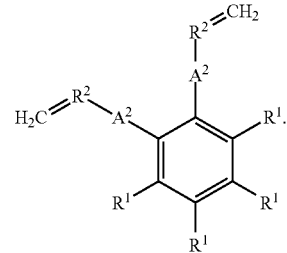

Formula 3C

In some aspects, the precursor monomer can have a structure according to any one of Formula 4A-Formula 4C.

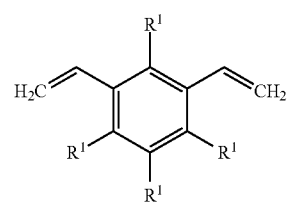

Formula 4A

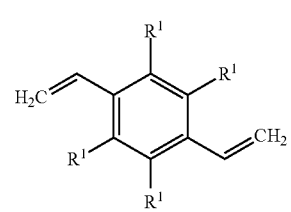

Formula 4B

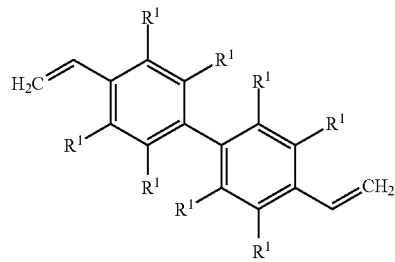

Formula 4C

In some aspects, the precursor monomer can have a structure according to the following formula

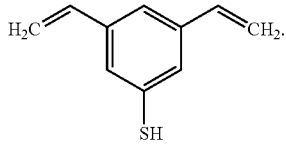

Suitable free radical initiators can include azobisisobutyronitrile, benzoyl peroxide, tert-butylperoxide, or a combination thereof. Suitable aprotic solvents can include dimethylsulfoxide, dimethylformamide, dimethylacetamide, 1-methyl-2-pyrrolidone, and combinations thereof. Suitable halides can include chloride or bromide.

The methods can include heating the mixture to a first elevated temperature for a first period of time to form the porous organic polymer having halide moieties covalently attached thereto. The first elevated temperature can be about 80° C. to about 140° C.; or about 90° C. to about 120° C. The first period of time can be about 12 hours to about 48 hours or about 18 hours to 36 hours.

The methods can include substituting the halide moieties with heavy metal chelator moieties to form the porous organic polymer having one or more heavy metal chelator moieties covalently attached thereto. The substitution can be accomplished by nucleophilic aromatic substitution of the halide, for example with a salt of the heavy metal chelator moiety.

EXAMPLES

Now having described the embodiments of the present disclosure, in general, the following Examples describe some additional embodiments of the present disclosure. Mile embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

In the following examples we create a thiol functionalized porous organic polymer (POP) using simple free radical polymerization techniques to prepare a cost-effective material with a high density of chelating sites designed for mercury capture and therefore environmental remediation. The resulting POP is able to remove aqueous and airborne mercury with uptake capacities of 1216 mg g$^{-1}$ and 630 mg g$^{-1}$, respectively. The material demonstrates rapid kinetics, capable of dropping the mercury concentration from 5 ppm to 1 ppb, lower than the US Environmental Protection Agency's drinking water limit (2 ppb), within ten minutes. Furthermore, the material has the added benefits of recyclability, stability in a broad pH range, and selectivity for toxic metals. These results are attributed to the material's physical properties, which include hierarchical porosity, a high density of chelating sites, and the material's robustness, which improve the thiol availability to bind with mercury as determined by XPS and XAFS studies. Our work provides promising results for POPs as an economical material for multiple environmental remediation applications.

Experimental Section

Chemicals and Material Synthesis

Commercially available reagents were purchased in high purity and used without further purification.

Synthesis of 3,5-Divinylbenzyl Chloride

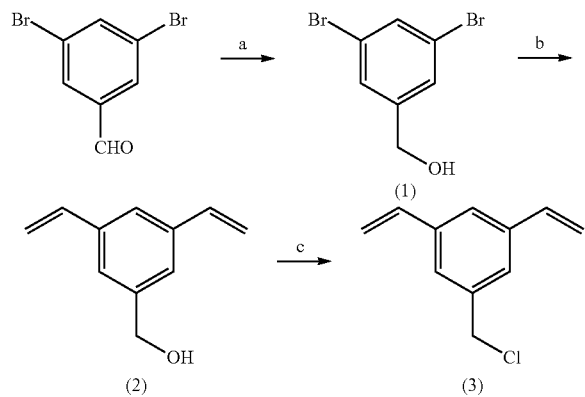

Reagents: (a) NaBH$_4$; (b) Potassium vinyltrifluoroborate, Pd(PPh$_3$)$_4$, K$_2$CO$_3$; (c) Cyanuric chloride, DMF Reagents: (a) NaBH$_4$; (b) Potassium vinyltrifluoroborate, Pd(PPh$_3$)$_4$, K$_2$CO$_3$; (c) Cyanuric chloride, DMF 3,5-Dibromobenzyl Alcohol (1)

3,5-dibromobenzaldehyde (5 g, 18.9 mmol) was dissolved in a mixture of ethanol (85 mL) and dichloromethane (85 mL). Sodium borohydride (1 g, 26.4 mmol) was subsequently added in 200 mg increments while stirring the solution. The final mixture was stirred at room temperature overnight and then evaporated under reduced pressure, producing a white solid. The solid was dissolved in dichloromethane and washed with deionized water to remove any produced salt. The organic layer was evaporated under reduced pressure, giving the title compound, which was used directly for the next step without further purification.[28] $^1$H NMR (400 MHz, d$_6$-DMSO, 298K, TMS): δ 7.50 (t, 1H, J=1.6 Hz), 7.50 (d, 2H, J=2.0 Hz), 5.43 (s, 1H), 4.48 (d, 2H, J=5.2 Hz) ppm.

3,5-Divinylbenzyl Alcohol (2)

1 (5.43 g, 20.4 mmol), potassium vinyltrifluoroborate (6.84 g, 51 mmol), and tetrakis(triphenylphosphine) palladium(0) (0.589 g, 0.51 mmol) were dissolved in a mixture of THF (50 mL), toluene (50 mL), and deionized water (20 mL) under N2 atmosphere. The resulting mixture was refluxed at 90° C. under N$_2$ atmosphere for 48 hr. The product was extracted with ethyl acetate, washed with brine, dried over magnesium sulfate, and evaporated under reduced pressure. The crude product was purified by flash chromatography with ethyl acetate:hexane (1:5) as the eluent to give the title compound. $^1$H NMR (400 MHz, d$_6$-DMSO, 298K, TMS): δ 7.41 (s, 1H), 7.31 (s, 2H), 6.69-6.75 (m, 2H), 5.84 (d, 2H, J=14.0 Hz) 5.25 (d, 2H, J=7.6 Hz), 4.48 (d, 2H, J=4.4 Hz) ppm.

3,5-Divinylbenzyl Chloride (3)

Cyanuric chloride (5 g, 27.1 mmol) was stirred with dimethylformamide (10 mL) for three hours to form a complex. 2 (3.2 g, 20.4 mmol) was dissolved in an excess of dichloromethane and added to the complex and stirred at room temperature overnight. The product was extracted with dichloromethane, washed with brine, and evaporated under reduced pressure. The crude product was purified by flash chromatography with ethyl acetate:hexane (1:10) as the eluent to give the title compound as a light yellow solid. Yield: 3.0 g (82.3%). $^1$H NMR (400 MHz, d$^6$-DMSO, 298K, TMS): δ 7.53 (s, 1H), 7.45 (d, 2H, J=1.6 Hz), 6.70-6.77 (m, 2H), 5.90 (t, 2H, J=9.0 Hz) 5.31 (d, 2H, J=10.8 Hz), 4.74 (s, 2H) ppm.

Synthesis of POP-SH:

To a solvothermal autoclave, 3,5-divinylbenzyl chloride (1 g) was added with azobisisobutyronitrile (25 mg) and dimethylformamide (10 mL). The autoclave was placed in an oven and heated to 100° C. for 24 hours. The resulting product was collected by filtration, washed with acetone, and dried under vacuum to produce POP-Cl.[27] Following, POP-Cl (250 mg) and sodium hydrosulfide (1.3 g) were placed in a 100 mL Schlenk tube, with ethanol (50 mL) being introduced under N$_2$ atmosphere and stirred at 75° C. for three days. The resulting product was collected by filtration, washed extensively with deionized water and ethanol, and dried under vacuum, producing POP-SH as a white powder. To confirm all the reactant was excluded, thermogravimetric analysis under air was performed, showing no remaining weight percentage (FIG. 6B), indicating no sodium hydrosulfide remained in the final POP-SH sample.

Sorption Experiments

The starting Hg$^{2+}$ stock solution was made by dissolving 0.2716 g HgCl$_2$ in 250 mL deionized water to create an 800 ppm Hg$^{2+}$ solution. The aqueous solutions of Hg$^{2+}$ with different concentrations were obtained by diluting the stock solution with proper amounts of deionized water unless otherwise indicated. The pH levels of the solutions were adjusted by HNO$_3$ or NaOH aqueous solution. The concentrations of Hg$^{2+}$ for all experiments were detected by inductively coupled plasma-optical emission spectroscopy (ICP-OES) and inductively coupled plasma-mass spectrometry (ICP-MS) for ppb level concentrations. All the adsorption experiments were performed at ambient conditions.

Hg$^{2+}$ Sorption Isotherm.

To obtain the adsorption isotherm for POP-SH, 5 mg of adsorbent was placed in 10 mL aqueous solutions of varying Hg$^{2+}$ concentrations (25-800 ppm). The solutions were sonicated to create full dispersion and then stirred overnight. The solutions were filtered through a 0.45 μm membrane filter and the filtrate was analyzed via ICP to determine the residual Hg$^{2+}$ concentrations. The amount adsorbed or uptake capacity, qe (mg g$^{-1}$), at equilibrium was calculated using Equation S1:

$$q_e = \frac{(C_0 - C_e) \times V}{m} \quad (S1)$$

Where $C_0$ and $C_e$ are the initial and equilibrium concentrations, respectively, V is the volume of solution used (mL), and m is the mass of adsorbent (g).

POP-SH Recyclability Test.

Approximately 100 mg of POP-SH@Hg was stirred in concentrated (12M) HCl for three hours. The solid was collected by centrifugation and repeated washing with HCl was performed. After centrifugation the solid was washed with deionized water and collected by filtration. The solid was washed with deionized water until the filtrate was a neutral pH and the product was dried under vacuum to produce POP-SH.

$Hg^{2+}$ Sorption Kinetics.

20 mg of POP-SH was added to an Erlenmeyer flask containing 200 mL of a 5 ppm $Hg^{2+}$ solution. The mixture was sonicated for full dispersion and then stirred overnight. At increasing time intervals 3 mL aliquots were removed from the mixture, filtered through a 0.45 μm membrane filter, and the filtrate was analyzed by ICP-MS for the remaining $Hg^{2+}$ concentration.

Distribution Coefficient Values ($K_d$).

To determine the affinity of $Hg^{2+}$ to the adsorbent the $K_d$ value was subsequently calculated from the kinetic performance. Specifically, after 20 mg of POP-SH was stirred in 5 ppm $Hg^{2+}$ solution overnight the $K_d$ value was calculated from the equilibrium data. Furthermore, the same method was used for the varying pH levels (pH=3 and 10).

Selectivity Test.

A mixed metal solution was made with either $Cl^-$ or $NO_3^{2-}$ salts of $Hg^{2+}$, $Ca^{2+}$, $Mg^{2+}$, $Cd^{2+}$, $Zn^{2+}$, $Pb^{2+}$, $Na^+$, and $Cu^{2+}$, with equal concentrations of ~5 ppm. 20 mg of POP-SH was added to 200 mL of the mixed metal solution, this was then sonicated for full dispersion and stirred overnight. The solutions were filtered through a 0.45 μm membrane filter, and the filtrate was analyzed by ICP for the remaining metal concentrations. The removal efficiency was calculated by Equation S2.

$$\text{Removal efficiency (\%)} = \frac{C_0 - C_e}{C_0} \times 100 \quad (S2)$$

Where $C_0$ and $C_e$ are the initial and equilibrium concentrations, respectively.

Breakthrough Test.

To simulate a flow-through system, 100 mg of POP-SH was packed into a 1 mL syringe. The mixed metal solution previously made was passed through the syringe, controlled by a syringe pump at a rate of 1 mL hr$^{-1}$. Approximately 16 mL of solution was passed through and collected at 4 mL increments. The samples were analyzed by ICP to determine the concentration change for all metals.

Spiked Ground and Potable Water Testing.

10 mg of POP-SH was added to an Erlenmeyer flask containing 100 mL of a 1 ppm $Hg^{2+}$ spiked ground or potable water solution. The mixture was sonicated for full dispersion and then stirred. At time intervals of 10 and 30 minutes, 3 mL aliquots were removed from the mixture, filtered through a 0.45 μm membrane filter, and the filtrate was analyzed by ICP-MS for the remaining $Hg^{2+}$ concentration.

Mercury Vapor Adsorption Tests.

Adsorbents, POP-SH and activated carbon, were held in a closed 20 mL vial for mercury vapor adsorption tests. Within the vial, a smaller vial containing 300 mg of elemental mercury, $Hg^0$, was placed inside. The apparatus was capped and placed in a sand bath with constant heating at 140° C. After eight days the system was cooled and the adsorbents were collected to determine their uptake capacity. To determine the exact amount of mercury captured, 5 mg of adsorbent after exposure to $Hg^0$ was dissolved in 5 mL of aqua regia at 50° C. for 24 hr. The resultant solution was diluted appropriately for ICP-OES analysis.

Characterizations $^1H$ NMR spectra were recorded on a Bruker Avance-400 (400 MHz) spectrometer. Chemical shifts are expressed in ppm downfield from TMS at δ=0 ppm, and J values are given in Hz. $^{13}C$ (100.5 MHz) cross-polarization magic-angle spinning (CP-MAS) was recorded on a Varian infinity plus 400 spectrometer equipped with a magic-angle spin probe in a 4-mm $ZrO_2$ rotor. CHNS elemental analysis was performed on a Perkin-Elmer series II CHNS analyzer 2400. The gas adsorption isotherms were collected on a surface area analyzer, ASAP 2020. The $N_2$ sorption isotherms were measured at 77 K using a liquid $N_2$ bath. Scanning electron microscopy (SEM) image was performed using a Hitachi SU 8000. Transmission electron microscope (TEM) image was performed using a Hitachi HT-7700. TGA was carried out on a Q50 thermogravimetric analyzer under N2 atmosphere. ICP-OES was performed on a Perkin-Elmer Elan DRC II Quadrupole. ICP-MS was performed on a Perkin-Elmer Elan DRC II Quadrupole Inductively Coupled Plasma Mass Spectrometer. UV-Vis spectra were collected on a Jasco V-670 spectrophotometer. Raman spectra were recorded on a Renishaw inVia model confocal microscopy Raman spectrometer equipped with a germanium CCD camera detector using 785 nm radiation from a HeNe laser for excitation and a resolution of 4 cm$^{-1}$. Laser power at the sample was estimated to be about 4 mW, and the focused laser beam diameter was 1 μm and the acquisition time was 10 s with accumulation 10 times. X-ray photoelectron spectroscopy (XPS) experiments were performed in a commercial multi-chamber system (SPECS Nano Analysis Gmbh, Berlin, Germany) under ultrahigh vacuum conditions ($2 \times 10^{-10}$ mbar base pressure) with a glovebox attached for direct transfer of samples. Samples were prepared on indium substrates and characterized by XPS (Mg K, 1253.6 eV, 20 mA emission current) measurement. Details of X-ray absorption fine structure (XAFS) spectroscopy studies are listed below.

TABLE 1

Figure 3A:
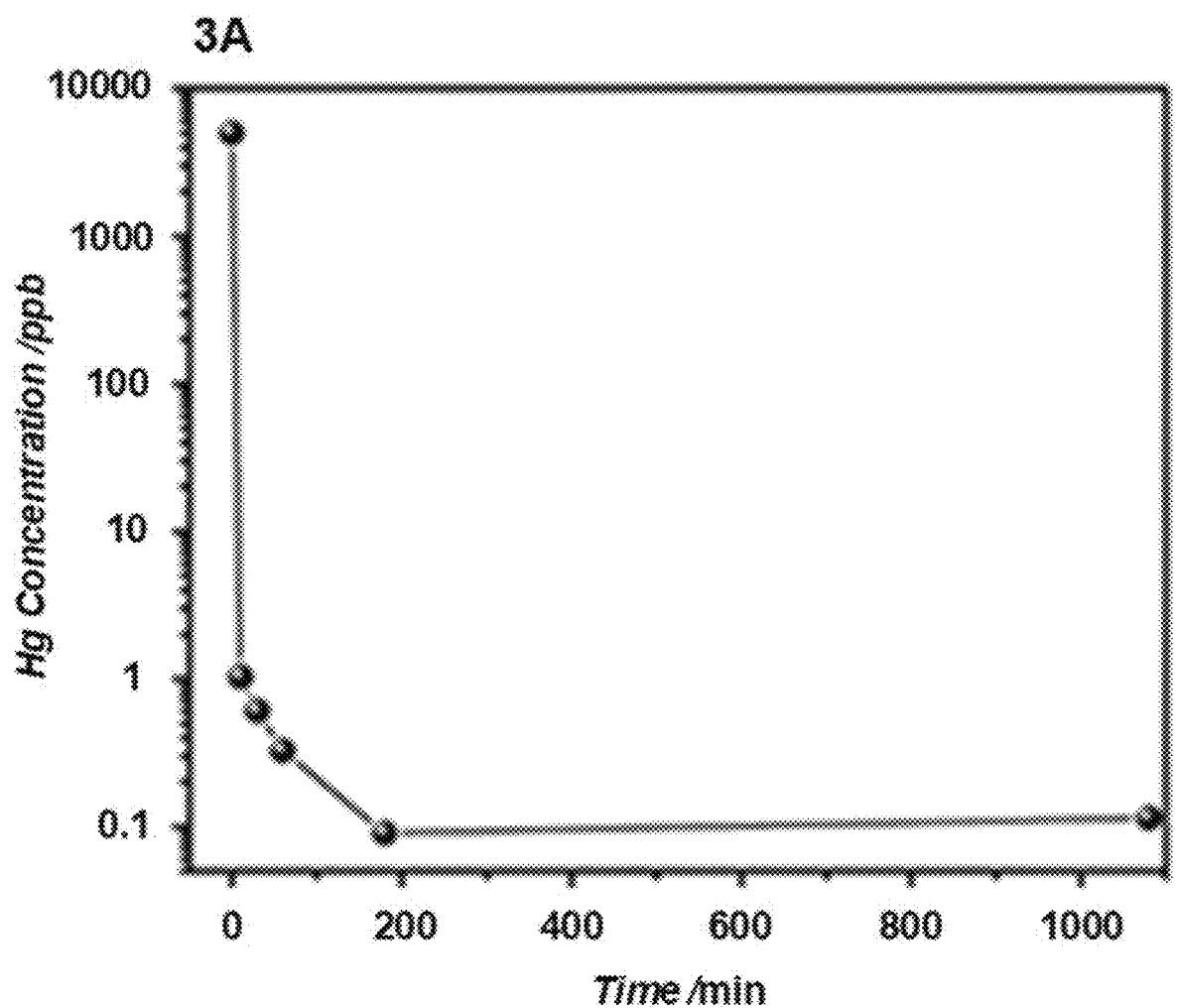
FIGS. 3A-3D show (FIG. 3A) Hg$^{2+}$ sorption kinetics of POP-SH with Hg$^{2+}$ initial concentration of 5 ppm.
Figure 3B:
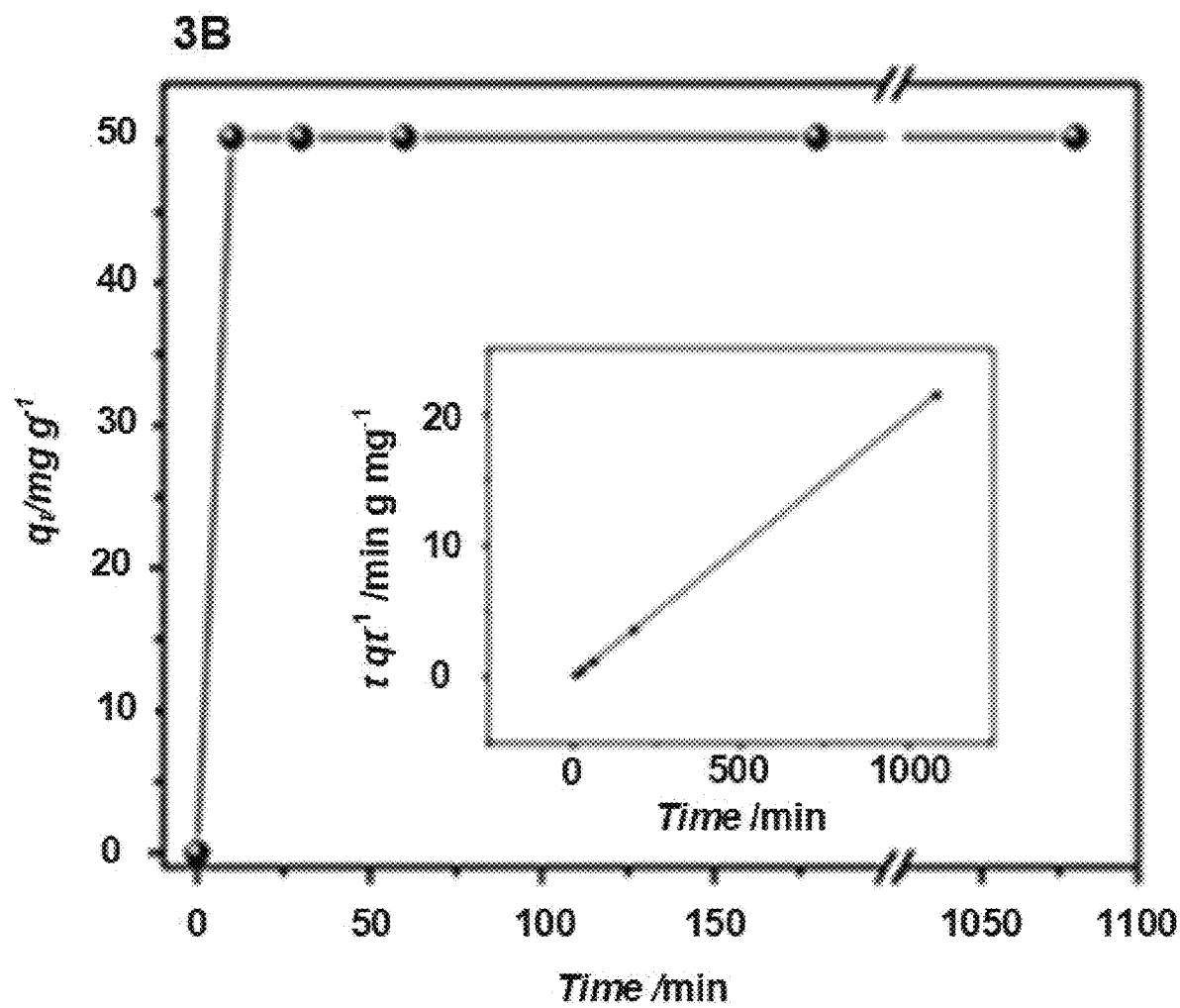
Figure 3C:
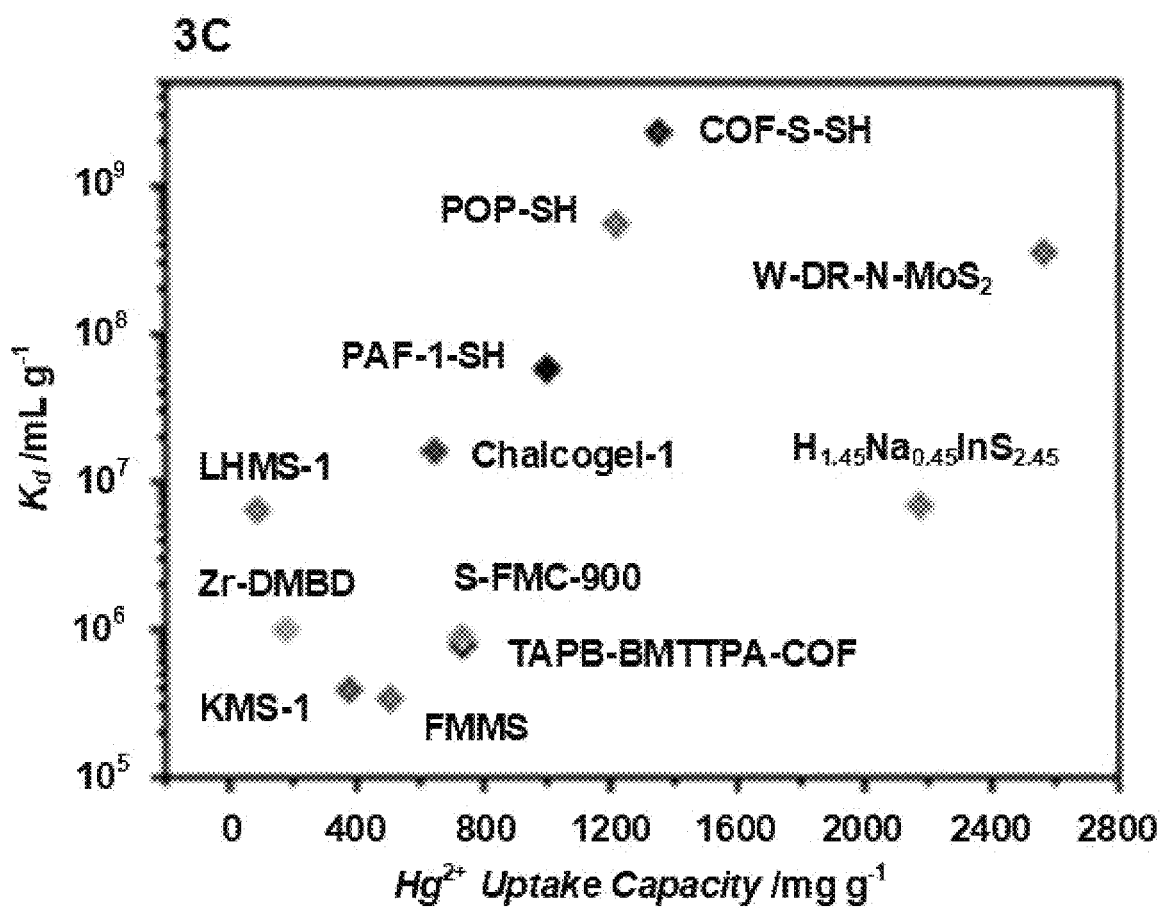

$Hg^{2+}$ sorption performance of materials as shown in FIG. 3C.

| Adsorbent | $K_d$ (mL g$^{-1}$) | $q_{max}$ (mg g$^{-1}$) | Remaining $Hg^{2+}$ concentration |
|---|---|---|---|
| POP-SH | $5.5 \times 10^8$ | 1216 | <0.1 ppb |
| PAF-1-SH[2] | $5.76 \times 10^7$ | 1000 | 0.4 ppb |
| FMMS[3] | $3.4 \times 10^5$ | 505 | 0.7 ppb |
| Chalcogel-1[4] | $1.61 \times 10^7$ | 645 | 0.04 ppm |
| Zr-DMBD[5] | $9.99 \times 10^5$ | 179 | <0.01 ppm |
| S-FMC-900[6] | $8.82 \times 10^5$ | 732 | <0.01 ppm |
| LHMS-1[7] | $6.4 \times 10^6$ | 87 | 0.1-17 ppb |
| KMS-1[8] | $3.5 \times 10^4$-$3.9 \times 10^5$ | 377 | 0.1-0.7 ppb |
| COF-S-SH[9] | $2.3 \times 10^9$ | 1359 | <0.1 ppb |
| W-DR-N-MoS$_2$[10] | $3.53 \times 10^8$ | 2563 | 0.2 ppb |
| $H_{1.45}Na_{0.45}InS_{2.45}$[11] | $6.9 \times 10^6$ | 2173 | — |
| TAPB-BMTTPA-COF[12] | $7.82 \times 10^5$ | 734 | 0.01 ppm |

TABLE 2

Selectivity results for POP-SH in mixed metal solution.

| | Hg | Pb | Cd | Cu | Ca | Zn | Mg | Na |
|---|---|---|---|---|---|---|---|---|
| Initial Concentration (ppm) | 5.10 | 4.89 | 4.75 | 5.01 | 4.60 | 4.35 | 4.66 | 4.67 |
| Equilibrium Concentration (ppm) | <0.1 | <0.1 | <0.1 | <0.1 | 4.01 | 3.75 | 4.11 | 4.58 |
| Removal Efficiency (%) | >98 | >98 | >98 | >98 | 12.8 | 13.8 | 11.8 | 1.93 |

TABLE 3

Breakthrough results for POP-SH in mixed metal solution.

| Run | $C_{Hg}$ | $C_{Pb}$ | $C_{Cd}$ | $C_{Cu}$ | $C_{Ca}$ | $C_{Zn}$ | $C_{Mg}$ | $C_{Na}$ |
|---|---|---|---|---|---|---|---|---|
| Initial | 5.10 | 4.89 | 4.75 | 5.01 | 4.60 | 4.35 | 4.66 | 4.67 |
| 1 | <0.1 | <0.1 | <0.1 | <0.1 | 3.78 | 3.45 | 3.91 | 4.28 |
| 2 | <0.1 | <0.1 | <0.1 | <0.1 | 3.91 | 3.54 | 4.00 | 4.31 |
| 3 | <0.1 | <0.1 | <0.1 | <0.1 | 3.88 | 3.70 | 3.87 | 4.38 |
| 4 | <0.1 | <0.1 | <0.1 | <0.1 | 4.01 | 3.84 | 4.10 | 4.47 |

*Concentrations in parts per million (ppm).

X-Ray Absorption Fine Structure (XAFS) Spectroscopy Sample Preparation and Data Collection To obtain a S:Hg ratio of five, 50 mg of POP-SH was stirred in 250 mL of Hg2+ aqueous solution (20 ppm) for 3 hrs. The mercury-included material was then collected by filtration and dried under vacuum. POP-SH was diluted to approximately 33% with urea. Approximately 20-25 mg of sample was enclosed within a nylon washer of 4.953 mm inner diameter (area of 0.193 cm2), sealed on one side with transparent "Scotch" tape. The sample was pressed thoroughly by hand to form a firm, uniform pellet, then sealed on the open side with a second piece tape.

XAFS spectra were collected at Stanford Synchrotron Radiation Lightsource (SSRL), Beamline 11-2. Spectra were collected at the Hg LIII-edge (12284 ev) in transmission mode. The X-ray beam was monochromatized by a Si(111) monochromater with higher order harmonics eliminated through a Rh-harmonic rejection mirror. Beam dimensions were 3 mm×1 mm. A HgCl2 standard prepared as powder-on-tape was used as the reference for energy calibration and was measured prior to collecting data for any experimental samples. The incident beam intensity (I0) and transmitted beam intensity (It) were measured by ionization chambers with 100% N2 gas composition. Data were collected in four regions, with all energies listed relative to the environmental Hg edge (12284 eV): −230 to 30 eV (10 eV step size, 0.25 s dwell time), −30 to −5 eV (5 eV step size, 0.5 s dwell time), −5 to 30 eV (1 eV step size), 3 Å-1 to 15 Å-1 (0.05 Å-1 step size), with dwell time increasing as a function of k from 2.0 s at 3 Å-1 to 16.0 s at 15 Å-1. Due to observance of minimal signal to noise, two scans were collected for each sample. All data were collected at room temperature.

The data were reformatted using SixPack[13] and then processed and analyzed, respectively, using the Athena and Artemis programs of the IFEFFIT package based on FEFF 6.[14] Reference data were aligned to the first zero-crossing of the second derivative of the normalized μ(E) data, which was subsequently calibrated to the literature E0 for the Hg LIII-edge (12284 eV). Spectra were averaged in μ(E) prior to normalization. The background was removed and the data were assigned an Rbkg value of 1.1.

EXAFS Fitting

All data were fit simultaneously with k-weighting of 1, 2, and 3, with the final refinement performed with $k^3$-weighting. Structural parameters that were determined by the fits include the fractional contribution of the scattering path (defined such that the total contribution of all scatterers equaled 2), the change in half-path length, $R_{eff}$ ($\Delta R_i$), the relative mean square displacement of the scattering element ($\sigma^2_i$), the passive electron reduction factor ($S_0^2$), and the energy shift of the photoelectron, ($\Delta E_0$). For each fit, the fit range ($\Delta R$), data range ($\Delta k$), number of independent points ($N_{idp}$), number of variables ($N_{var}$), degrees of freedom (v), reduced chi-squared value ($\chi_v^2$), and R-factor (R) are in Table 4. For each fit, the number of independent points was not permitted to exceed ⅔ the number of variables, adhering to the Nyquist criterion.[15]

TABLE 4

Data range and goodness-of-fit parameters for best fit models.

| Sample | $\Delta R$ (Å) | $\Delta k$ (Å$^{-1}$) | $N_{idp}$ | $N_{var}$ | v | $X_v^2$ | R(%) |
|---|---|---|---|---|---|---|---|
| POP-SH | 1.5-3.0 | 3.8-14.8 | 10.3 | 6 | 4 | 6.9 | 1.3 |

POP-SH

POP-SH was fit with a model composed of two Hg—S scattering paths. With the degeneracy for each path fixed at 2, the $S_0^2$ parameter was scaled by a fractional contribution variable (F) while the $S_0^2$ parameter other scattering path was scaled by (1-F). Each scattering path was afforded its own variable for ΔR, but shared a common parameter for $\sigma^2$. In this manner, the data were analyzed in the most conservative manner capable of providing a reliable fit of the data. Fitted EXAFS spectra are displayed in FIGS. 3A-3D. Final fit parameters are provided in Table 4.

TABLE 5

Fitted Parameters and Refined Hg-S Bond Lengths for Hg-EXAFS Data

| Parameter | COF-S-SH |
|---|---|
| $S_0^2$ | 0.88 ± 0.08 |
| $\Delta E_0$ | 5.4 ± 2.2 |
| F (%) | 31 ± 5 |
| $R_{S1}$ (Å)$^a$ | 2.37 ± 0.01 |
| $R_{S2}$ (Å)$^a$ | 2.26 ± 0.02 |
| $\Delta R_{S1}$ (Å) | 0.00 ± 0.01 |
| $\Delta R_{S2}$ (Å) | −0.11 ± 0.02 |
| $\sigma^2$ (×10$^{-3}$ Å$^2$) | 2.1 ± 0.2 |

The aforementioned POP-SH was synthesized via free radical polymerization of 3,5-divinylbenzyl chloride with azobisisobutyronitrile (AIBN), a free radical initiator, dissolved in dimethylformamide (DMF) and heated to 100° C. in a solvothermal autoclave for 16 hours. The thiol group cannot be incorporated into the monomer unit, as it is a free radical quencher. Therefore, further treatment of the obtained solid is required with sodium hydrosulfide in ethanol under nitrogen, heated to 75° C. for three days, which gave the thiol-functionalized polymer, POP-SH.

Figure 5:
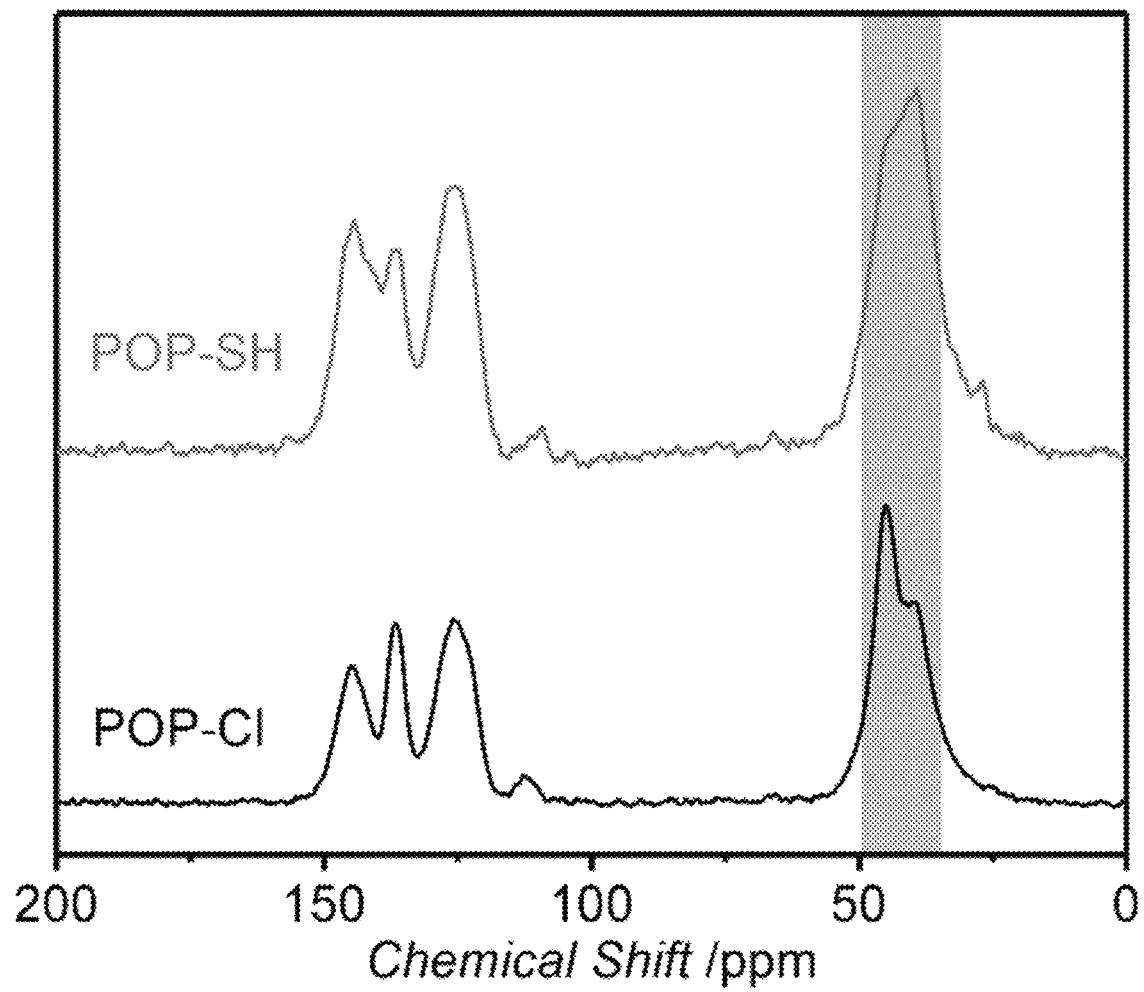
FIG. 5 shows $^{13}$C NMR spectra of POP-Cl and POP-SH.

To confirm the thiol conversion, solid-state $^{13}$C NMR studies and elemental analysis were performed. The $^{13}$C NMR spectra showed the chemical shift for the methyl chloride bond in POP-Cl at approximately 46 ppm. After the conversion the peak was slightly shifted downfield to 30 ppm, indicative of the methyl sulfur bond of POP-SH (FIG. 5).[17] Through elemental analysis the sulfur content was found to be 16.3 wt %, corresponding to 5.09 mmol V sulfur species. This value accounts for approximately 90% substitution of the chloride groups by thiol groups and is proposed to occur due to the high accessibility within the porous matrix.

Figure 1B:
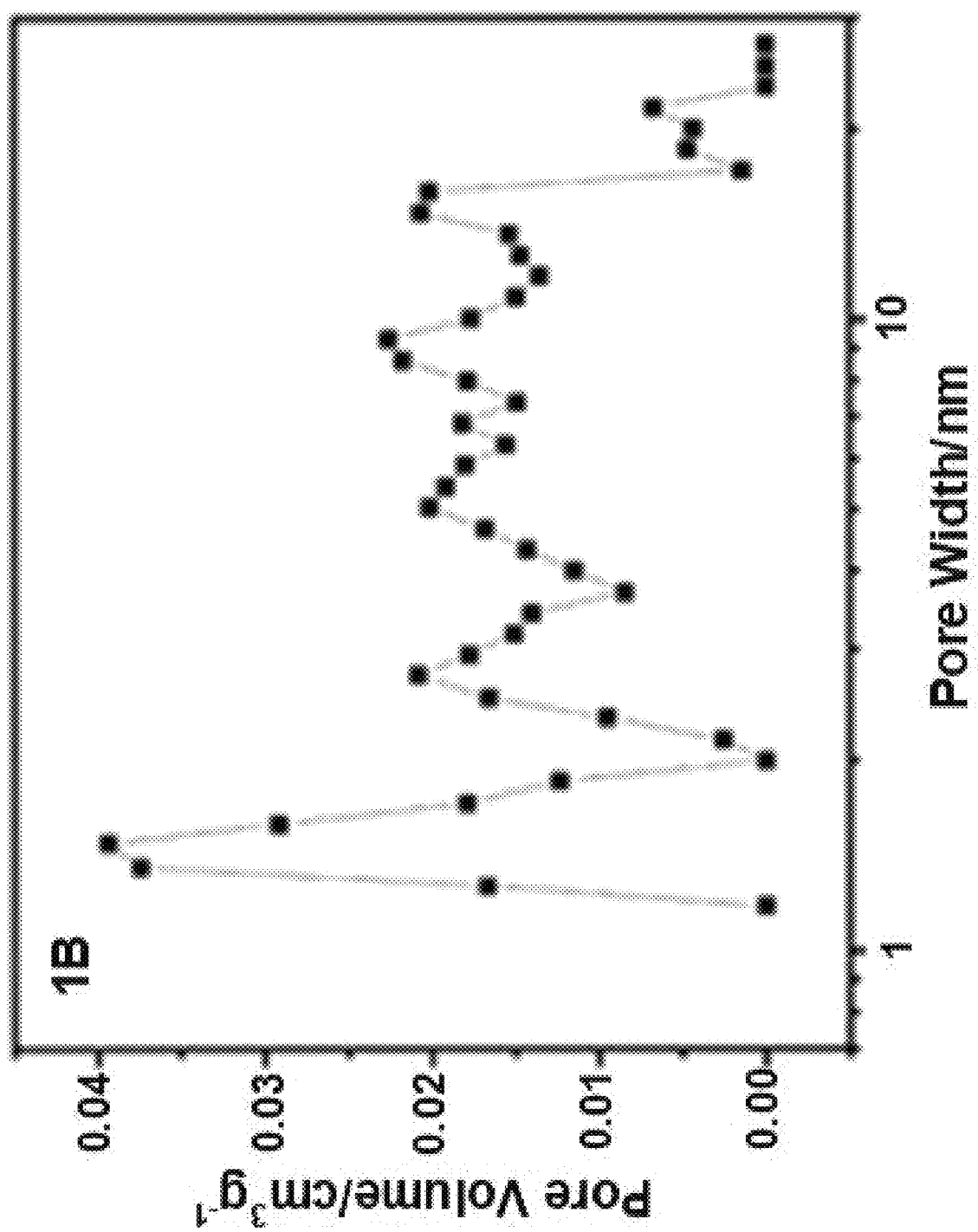
Figure 1C:
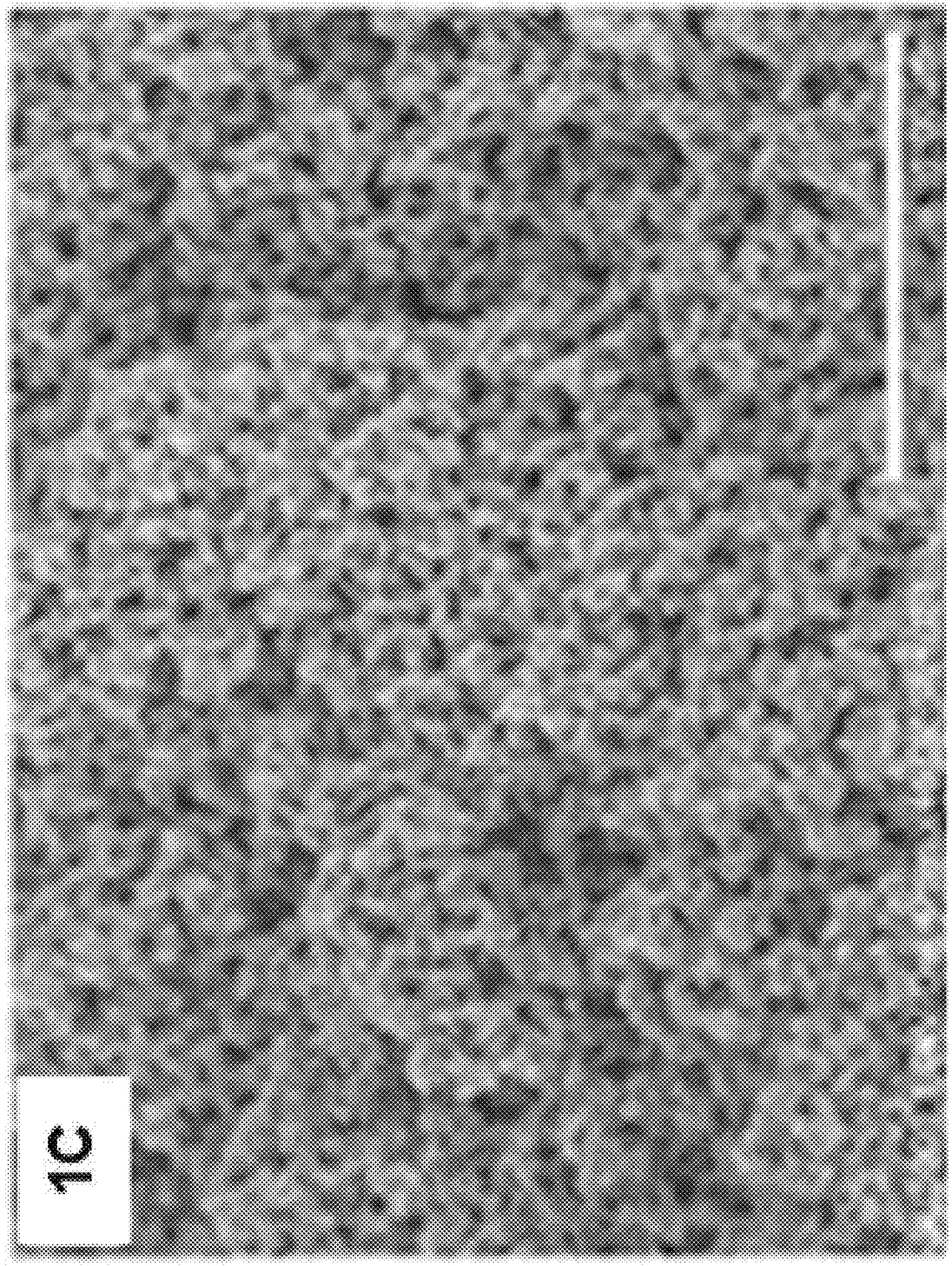
Figure 1D:
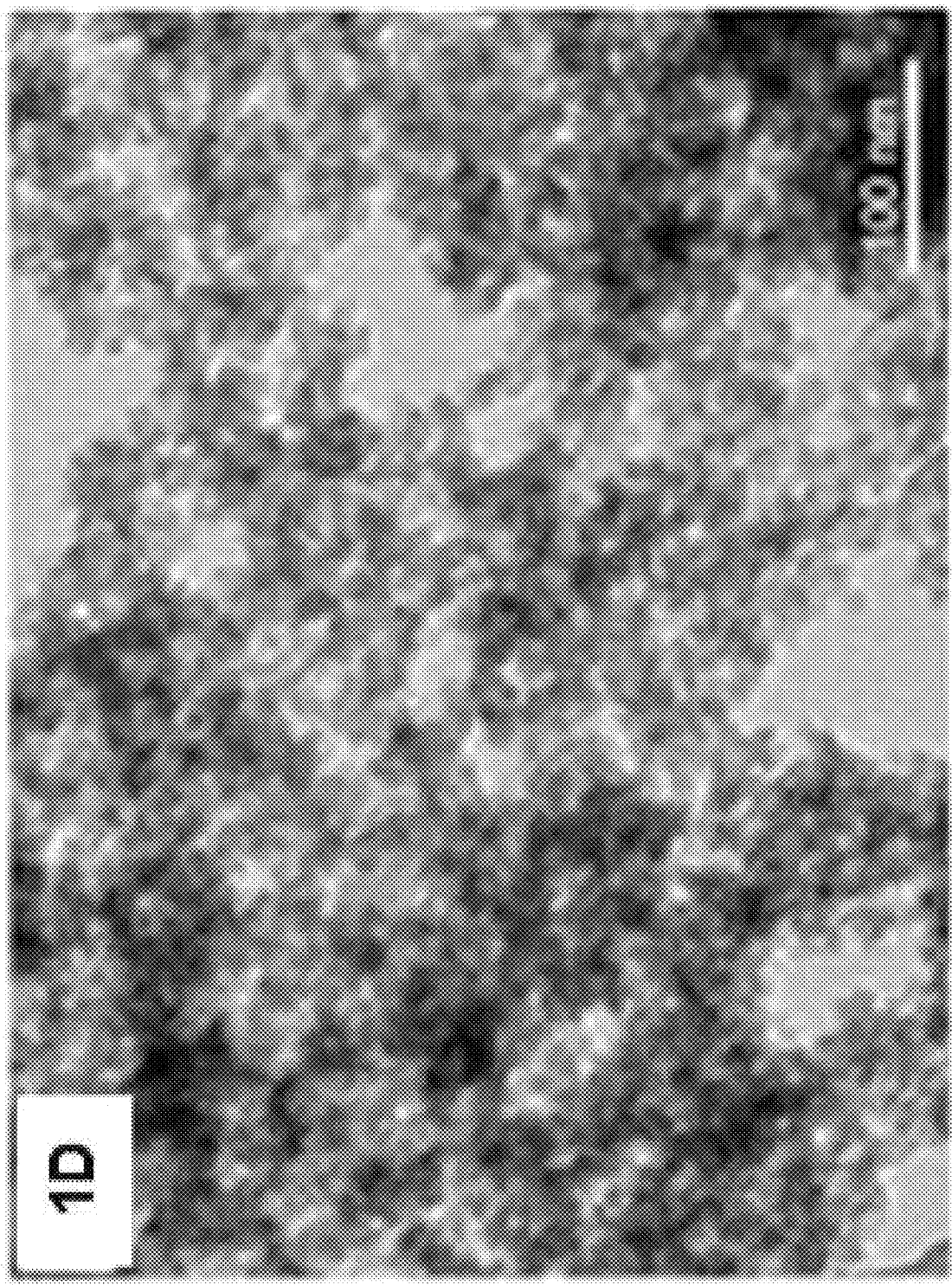
Figure 6A:
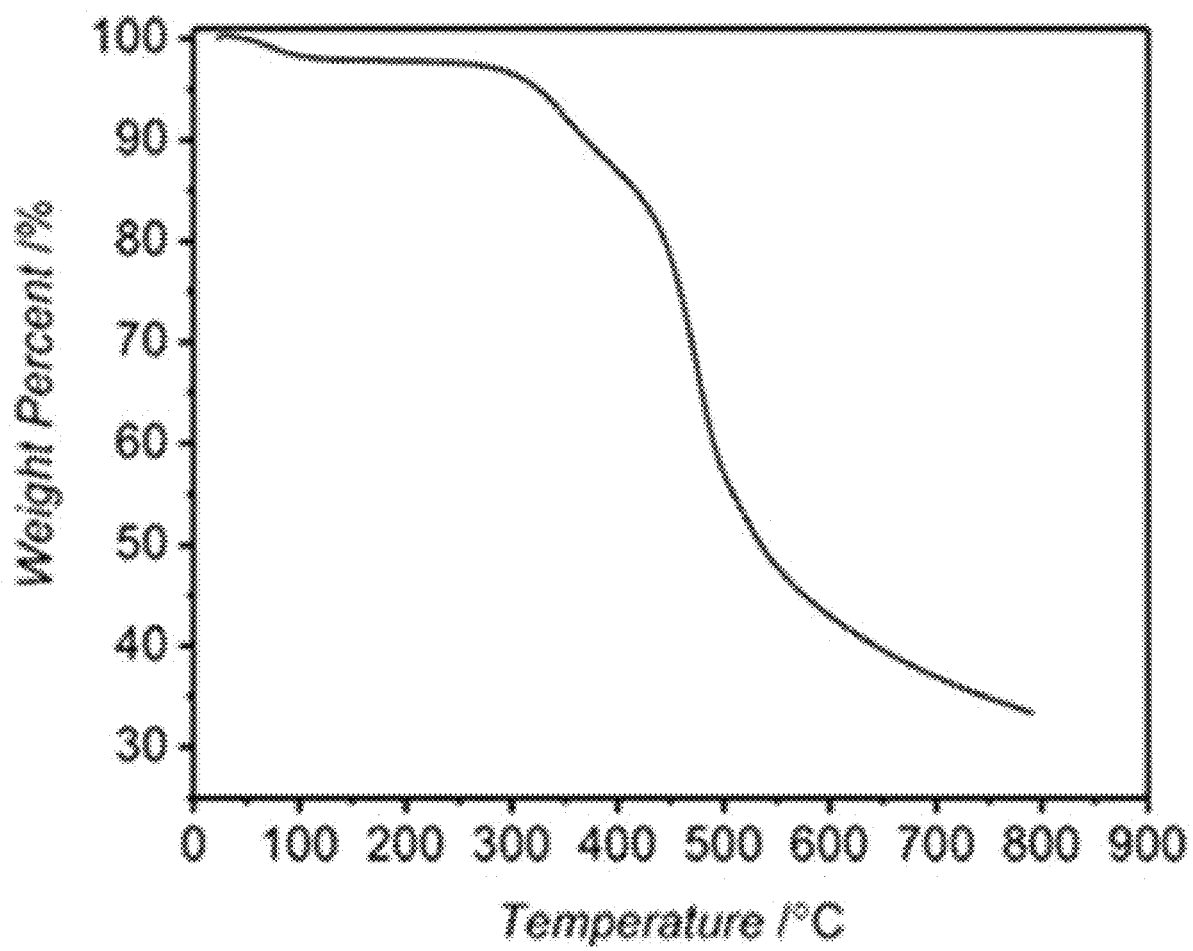
FIGS. 6A-6B show thermogravimetric analysis plot of POP-SH (FIG. 6A) under nitrogen and (FIG. 6B) under air.
Figure 6B:
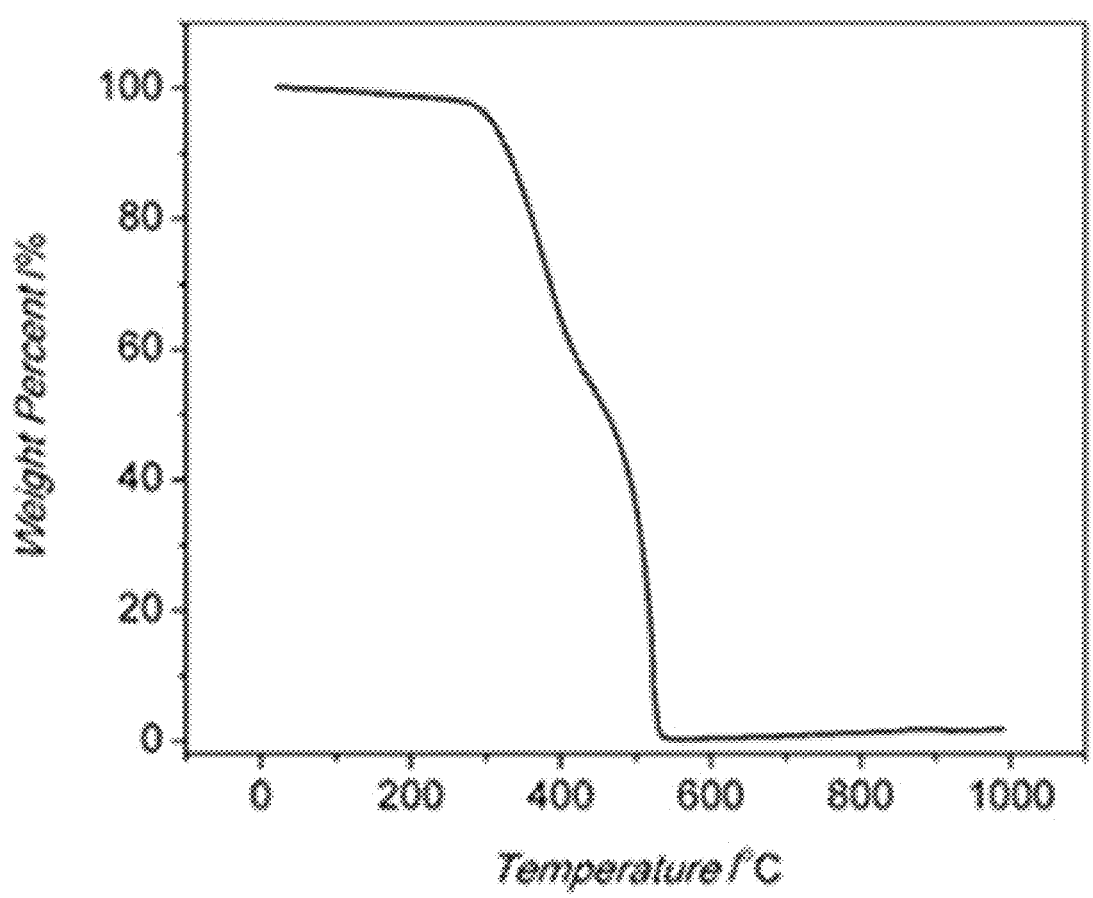

For the final amorphous product, nitrogen adsorption isotherms were collected at 77 K with the calculated Brunauer-Emmett-Teller (BET) surface area equaling 1061 $m^2\ g^{-1}$ (FIG. 1A). The hysteresis loop shown in the isotherms and the calculated NLDFT pore size distribution are indicative of the hierarchical porosity, from 1 to 10 nm, present in POP-SH that provides high accessibility to the chelating sites (FIG. 1B). To further confirm the hierarchical porosity of POP-SH, scanning electron micrograph (SEM) and transmission electron micrograph (TEM) images were taken (FIGS. 1C-1D). Thermogravimetric analysis revealed minimal weight loss below 300° C. corresponding to residual solvent loss, substantiating the high stability of POP-SH (FIG. 6A).

Figure 2:
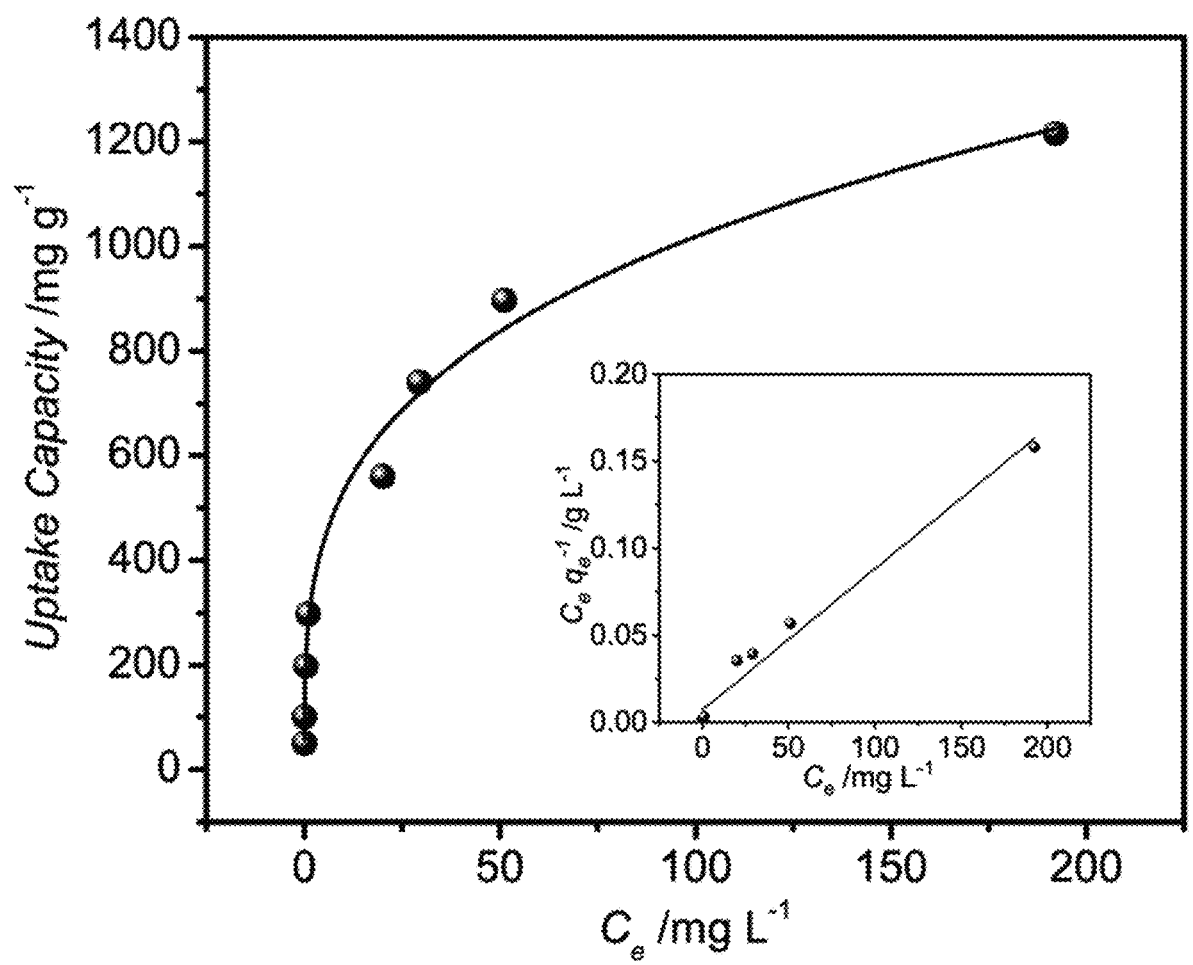
FIG. 2 shows Hg$^{2+}$ adsorption isotherm for POP-SH. Inset shows the linear regression by fitting the equilibrium data with the Langmuir adsorption model.
Figure 7:
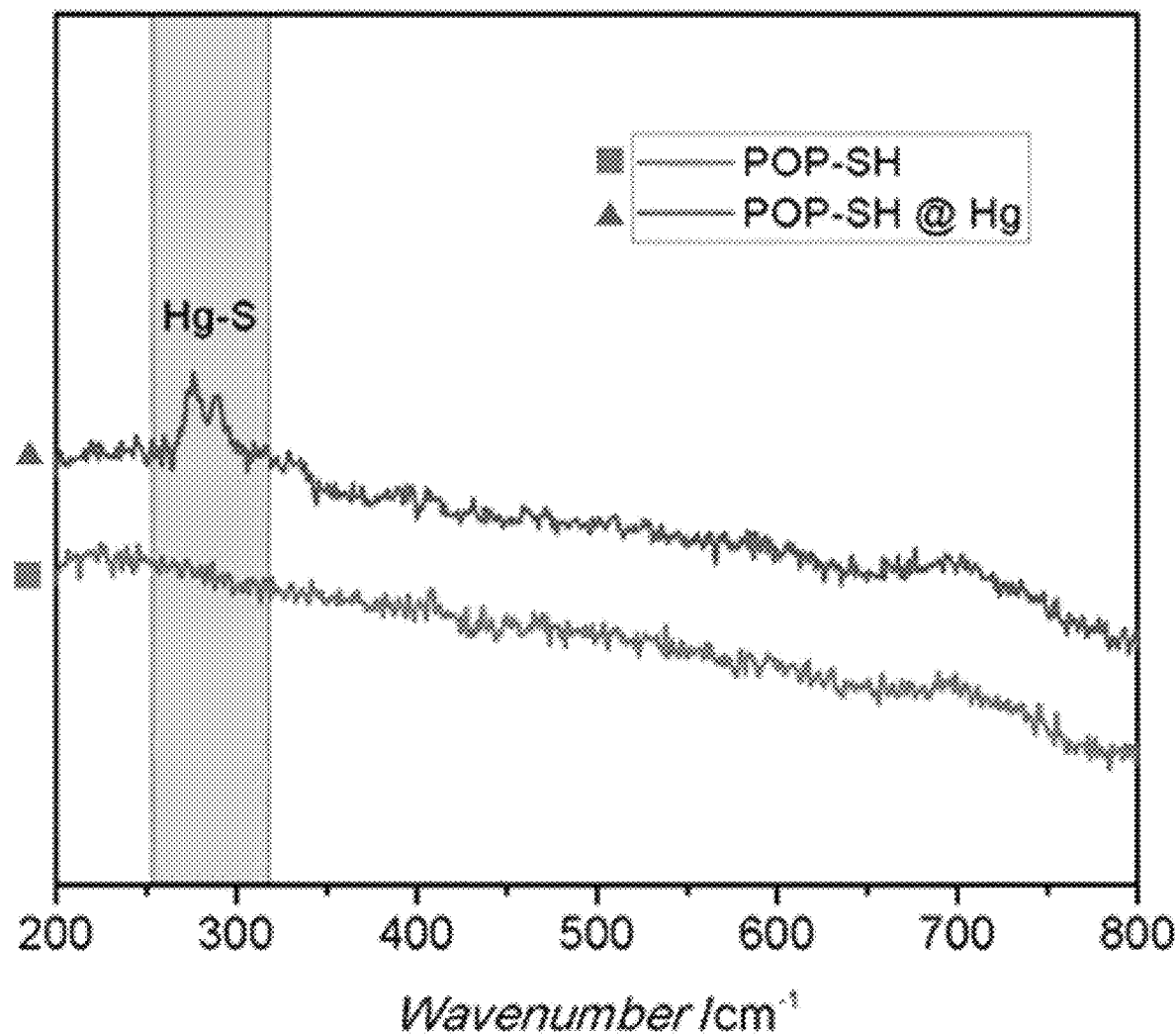
FIG. 7 shows a Raman spectra of POP-SH and POP-SH©Hg.
Figure 8:
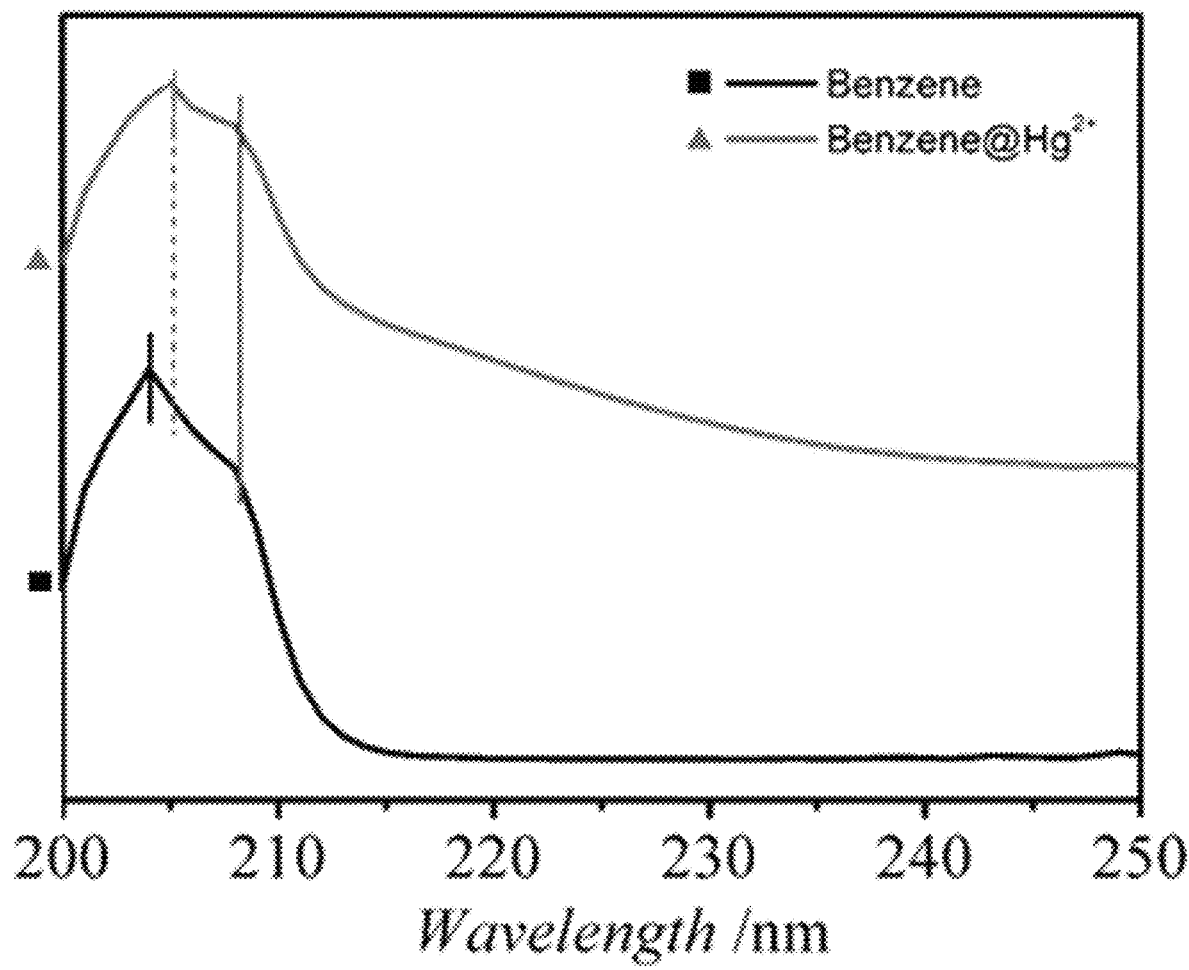
FIG. 8 shows UV-Vis spectra of benzene@Hg$^{2+}$.

As a preliminary study, experimental work was done to determine the maximum uptake capacity of POP-SH to remove $Hg^{2+}$ from an aqueous solution. The adsorption isotherm shown in FIG. 2 displays equilibrium data obtained for aqueous solutions with initial $Hg^{2+}$ concentrations ranging from 25 to 800 ppm after treatment with POP-SH. The equilibrium adsorption data was well fitted with the Langmuir model, with a correlation coefficient equal to 0.989. The uptake capacities for each point were calculated and the maximum was found to be 1216 mg $g^{-1}$ (with an equilibrium concentration of 200 ppm), outperforming many previously reported materials.[7-16] Furthermore, with only a simple washing procedure POP-SH could be fully regenerated, achieving a similar uptake capacity of 1250 mg $g^{-1}$. The full retention of the uptake capacity is due to the stability of the framework and the thiol functionality, leading to no disulfide bond formation, which compromise the mercury removal performance. This is evidenced by the absence of the S—S stretching band at ~500 $cm^{-1}$ in the Raman spectrum of the regenerated POP-SH sample (FIG. 7).[18] Based on the sulfur content of POP-SH the theoretical uptake capacity was calculated to be 1018 mg $g^{-1}$. The increased capacity found experimentally can be attributed to the conjugated nature of POP-SH, resulting in cation-π interactions between the benzene rings of POP-SH and mercury cations. To further support this claim, UV-vis spectra have been collected and an apparent red shift was observed at the characteristic band ascribed to benzene after introduction of mercury (FIG. 8).[19]

Kinetic studies were performed on POP-SH in removing mercury from solutions, as rapid decontamination of heavy metals is vital for a material to have prospects in any practical applications. Beginning with a 5 ppm solution of $Hg^{2+}$, aliquots were taken at different time intervals following treatment with POP-SH and analyzed using inductively coupled plasma-mass spectrometry (ICP-MS) for their remaining $Hg^{2+}$ concentrations (FIG. 3A). Within ten minutes the concentration was lowered to 1 ppb, already less than the US Environmental Protection Agency (EPA) acceptable limit of 2 ppb[20] and after three hours the concentration was as low as 0.1 ppb, reaching the detection limit of the instrument. The experimental kinetic data was fitted to a pseudo-second order kinetic model using Equation 1. Where $k_2$ is the adsorption rate constant (g $mg^{-1}\ min^{-1}$), t is time (min), and $q_t$ and $q_e$ are the uptake capacities (mg $g^{-1}$) at time (t) and equilibrium, respectively.

$$\frac{t}{q_t} = \frac{1}{k_2 q_e^2} + \frac{t}{q_e} \quad (1)$$

From FIG. 3B, the adsorption rate constant, $k_2$, was found to be 10.76 g $mg^{-1}\ min^{-1}$, illustrating the rapid removal of mercury from aqueous solutions. Previous work has suggested applicability of pseudo-second order kinetics to adsorption by porous materials implies that the rate is limited by intraparticle diffusion.[21] Therefore, the fast kinetics can be ascribed to the inherent properties of the material, namely the hierarchical porosity, as well as the high density of chelating sites. Together these offer readily available thiol groups to bind with mercury.

To quantify the affinity of an adsorbent for mercury, distribution coefficient ($K_d$) values were thus calculated using Equation 2. Where $C_0$ and $C_e$ are the initial and equilibrium concentrations, respectively, V is the volume of solution (mL), and m is the mass of adsorbent used (g).

$$K_d = \frac{(C_o - C_e)}{C_e} \times \frac{V}{m} \quad (2)$$

For POP-SH, the $K_d$ value was calculated to equal 5.5× $10^8$ mL $g^{-1}$, which is comparable to the best thiol functionalized adsorbents reported thus far, as seen in FIG. 3C, with the added benefit of simple synthetic procedures for large-scale applications. Though the metal sulfide materials demonstrate superior uptake capacities, they lack the ability to be recycled for multiple uses.[13f, 13g] It is interesting to note that even when the mercury solution was adjusted to pH levels of three and ten, the $K_d$ values were still as high as 2.1×$10^7$ and 1.3×$10^8$ mL $g^{-1}$, respectively. Both of these values still indicate exceptional affinity toward mercury.[10b] The ability of POP-SH to successfully capture mercury at different pH values is important due to the varying acidity levels of the diverse wastewater composition.

Figure 3D:
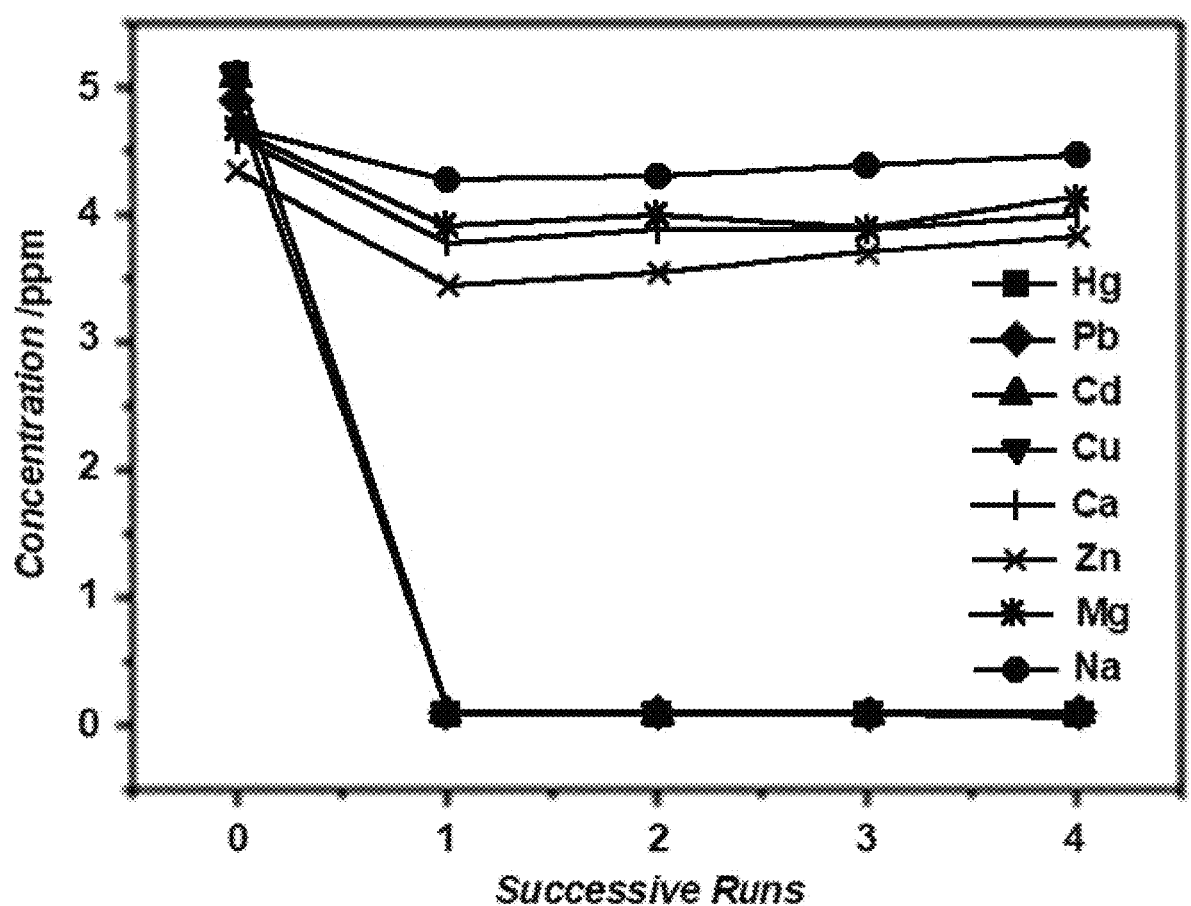

As a final marker for an adsorbent's capabilities, it must selectively remove mercury in the presence of other ions. Initial batch studies were performed with a solution containing $Hg^{2+}$, $Pb^{2+}$, $Cd^{2+}$, $Cu^{2+}$, $Ca^{2+}$, $Zn^{2+}$, $Mg^{2+}$, and $Na^+$ with nearly equal concentrations. After treatment with POP-SH, not only was mercury removed with over 98% efficiency, but the other toxic metals—$Pb^{2+}$, $Cd^{2+}$, and $Cu^{2+}$— were also captured while the non-toxic ions were relatively unchanged (Table 2). To simulate a flow-through system for water purification purposes a breakthrough study was also performed with the same mixed ion solution. As seen in FIG. 3D, even after four successive runs, the toxic metals were dropped to ppb level while the non-toxic metals were minimally affected. Further testing of the mercury content revealed a residual concentration of 0.3 ppb, almost ten times lower than the EPA standard. These results can be attributed to the soft-soft interactions between the thiol group and the soft metal cations, $Hg^{2+}$, $Cd^{2+}$, and $Cu^{2+}$, and borderline $Pb^{2+}$,[8a] further confirming the importance of the thiol functionality on the POP. Mercury spiked solutions of ground and potable water were also tested. After 30 minutes of treatment the concentration was dropped to 0.44 and 0.25 ppb, respectively, demonstrating the true applicability of POP-SH for water treatment.

With such promising results for POP-SH to remove mercury from various aqueous solutions, its ability to remove mercury by vapor adsorption was also examined.

One of the main causes of mercury release into the environment is from industrial flue gas. Previous adsorbents were unable to withstand such harsh conditions, but with the high stability of POP-SH this issue is circumvented.[22] Following a previously reported procedure,[14e] elemental mercury was placed in a small vial surrounded by the material; the apparatus was then sealed and heated to 140° C. After eight days the adsorbent was removed, dissolved in aqua regia, and analyzed by inductively coupled plasma-optical emission spectrometry (ICP-OES) for its mercury content. It was found that POP-SH achieved a $Hg^0$ uptake capacity of 630 mg $g^{-1}$, greatly outperforming a thiol-functionalized MOF (83.6 mg $g^{-1}$)[14e] and activated carbon (47 mg $g^{-1}$, BET=1011 $m^2$ $g^{-1}$) under identical conditions. The ability of POP-SH to retain thiol functionality and mercury capture at elevated temperatures highlights its possibilities in many applications.

Figure 9A:
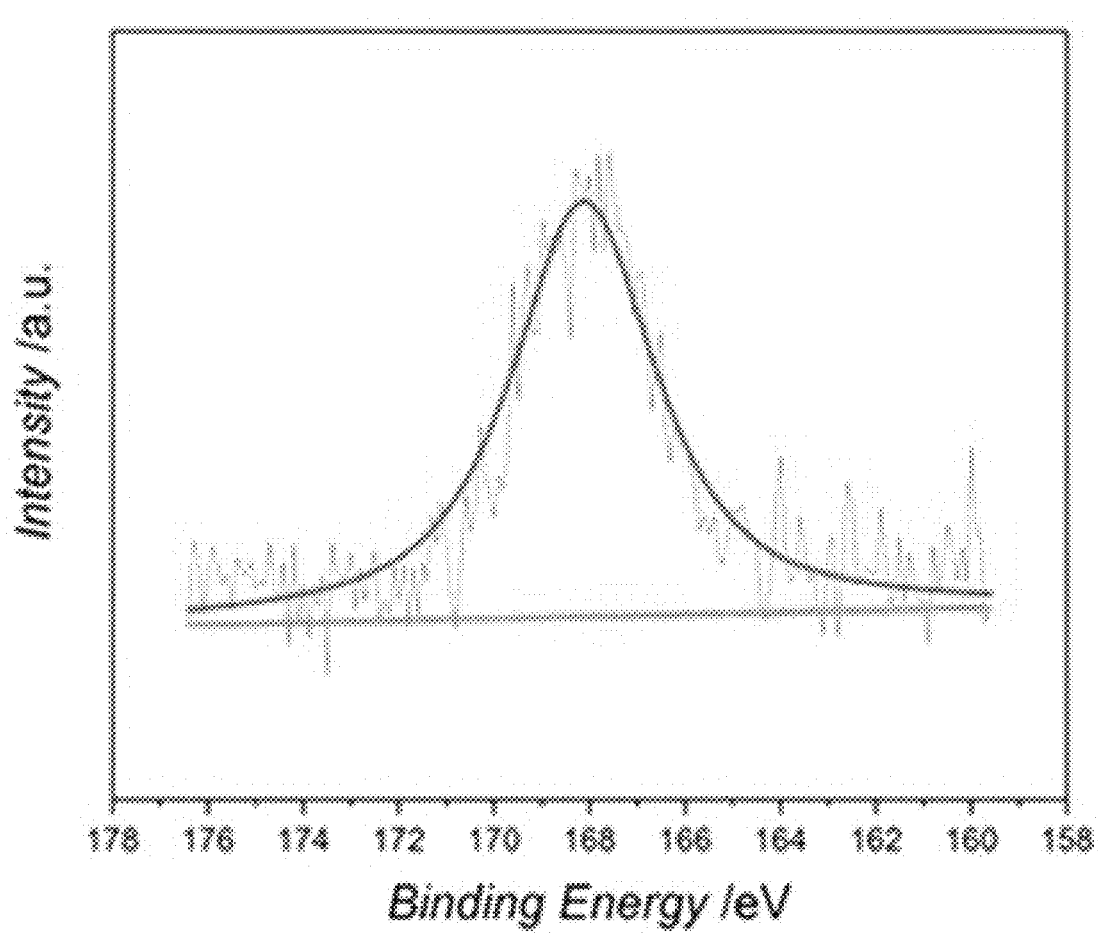
FIGS. 9A-9C show S 2p core level high-resolution XPS spectra of POP-SH and POP-SH@Hg and Hg 4f core level high-resolution XPS spectra for POP-SH@Hg.
Figure 9B:
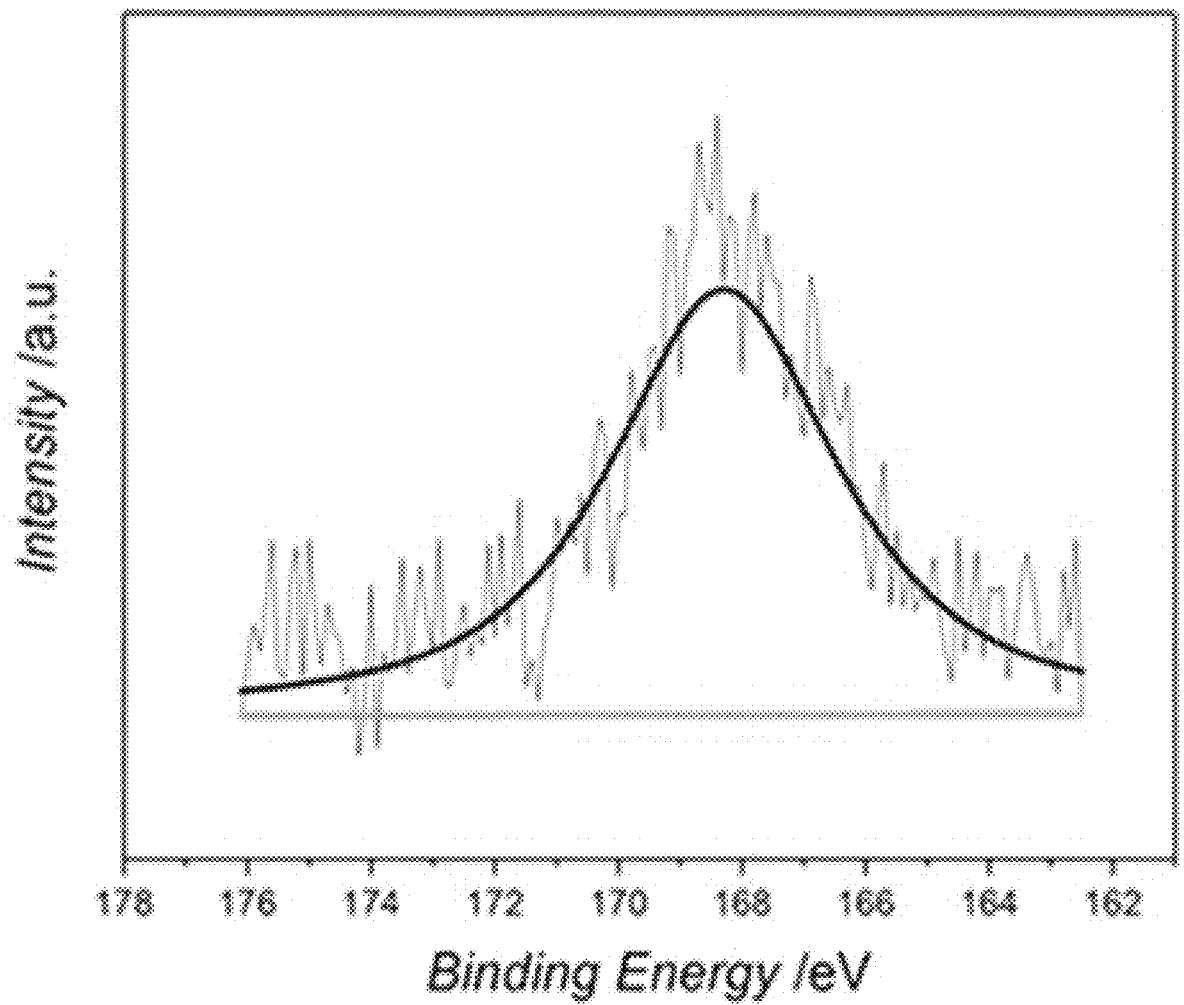
Figure 9C:
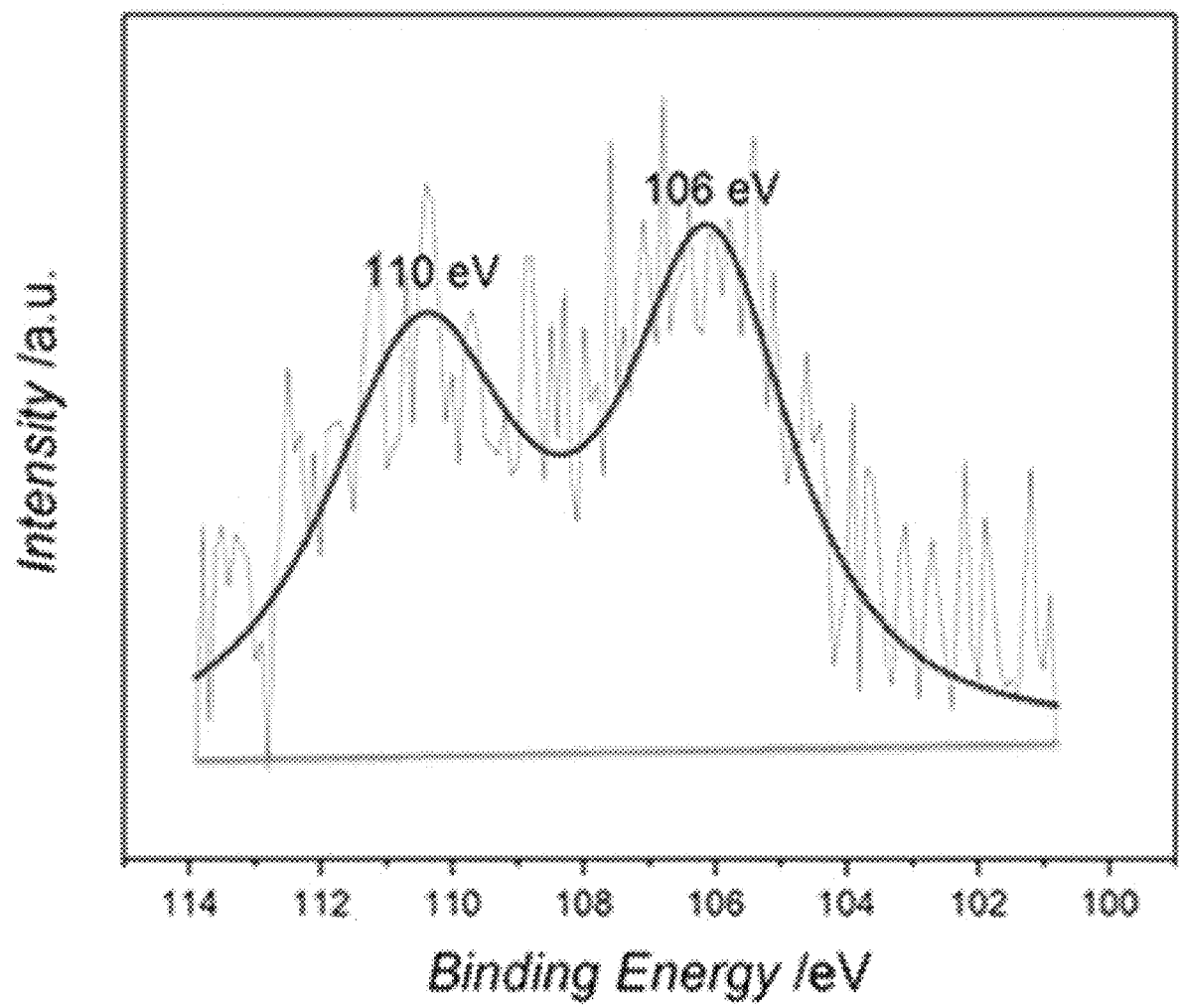
Figure 10A:
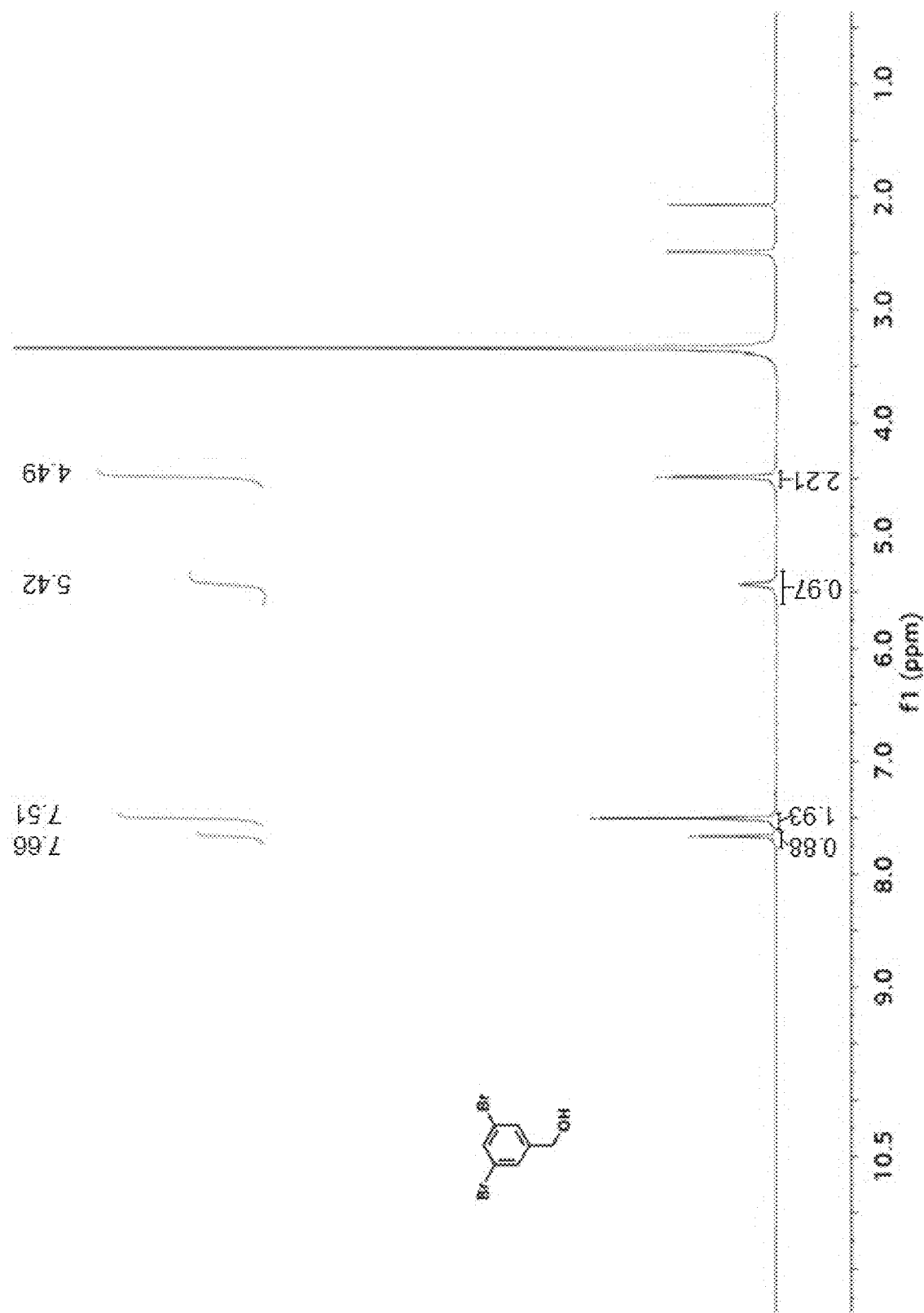
FIGS. 10A-10C show liquid $^1$H NMR spectra of various compounds.
Figure 10B:
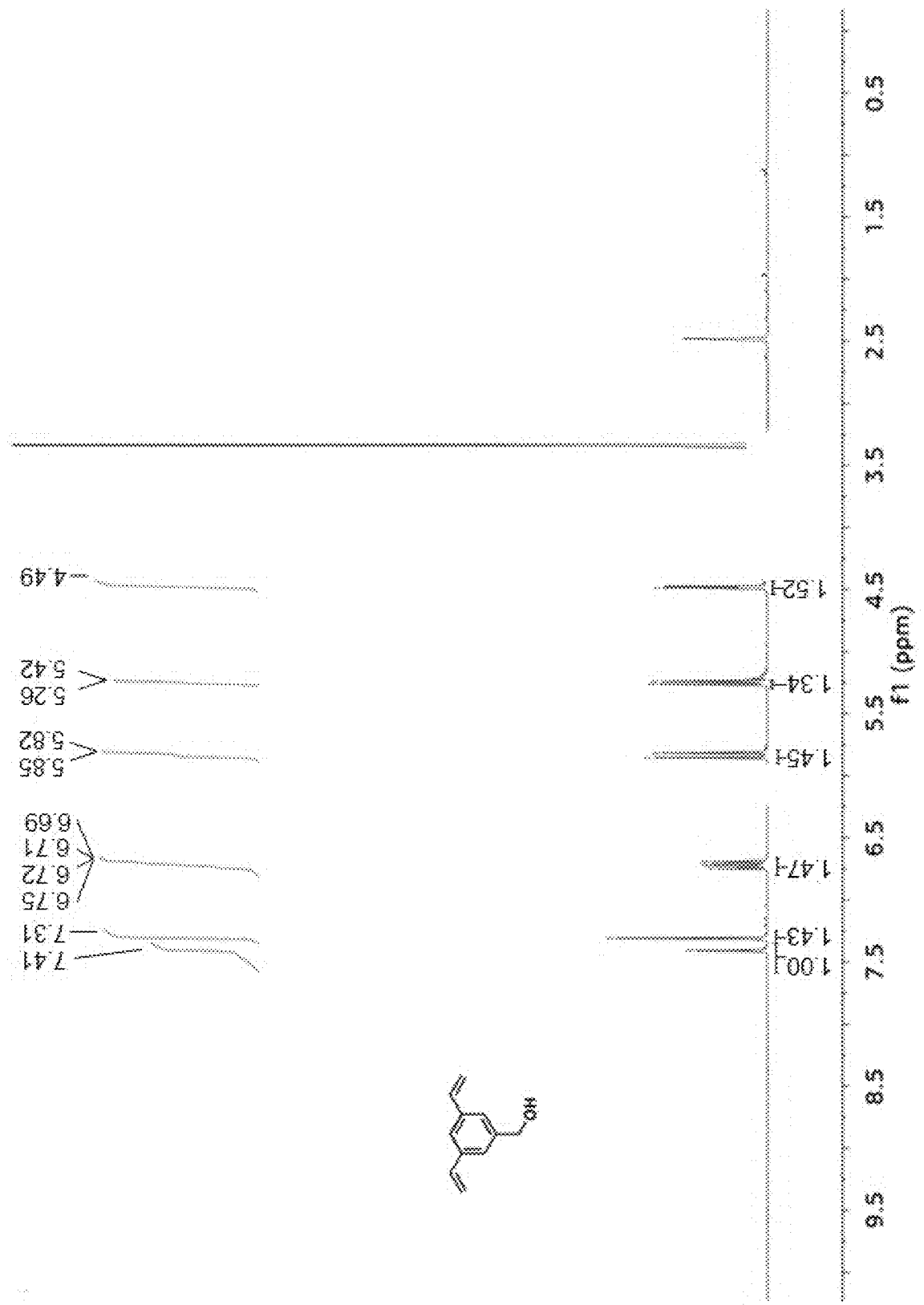
Figure 10C:
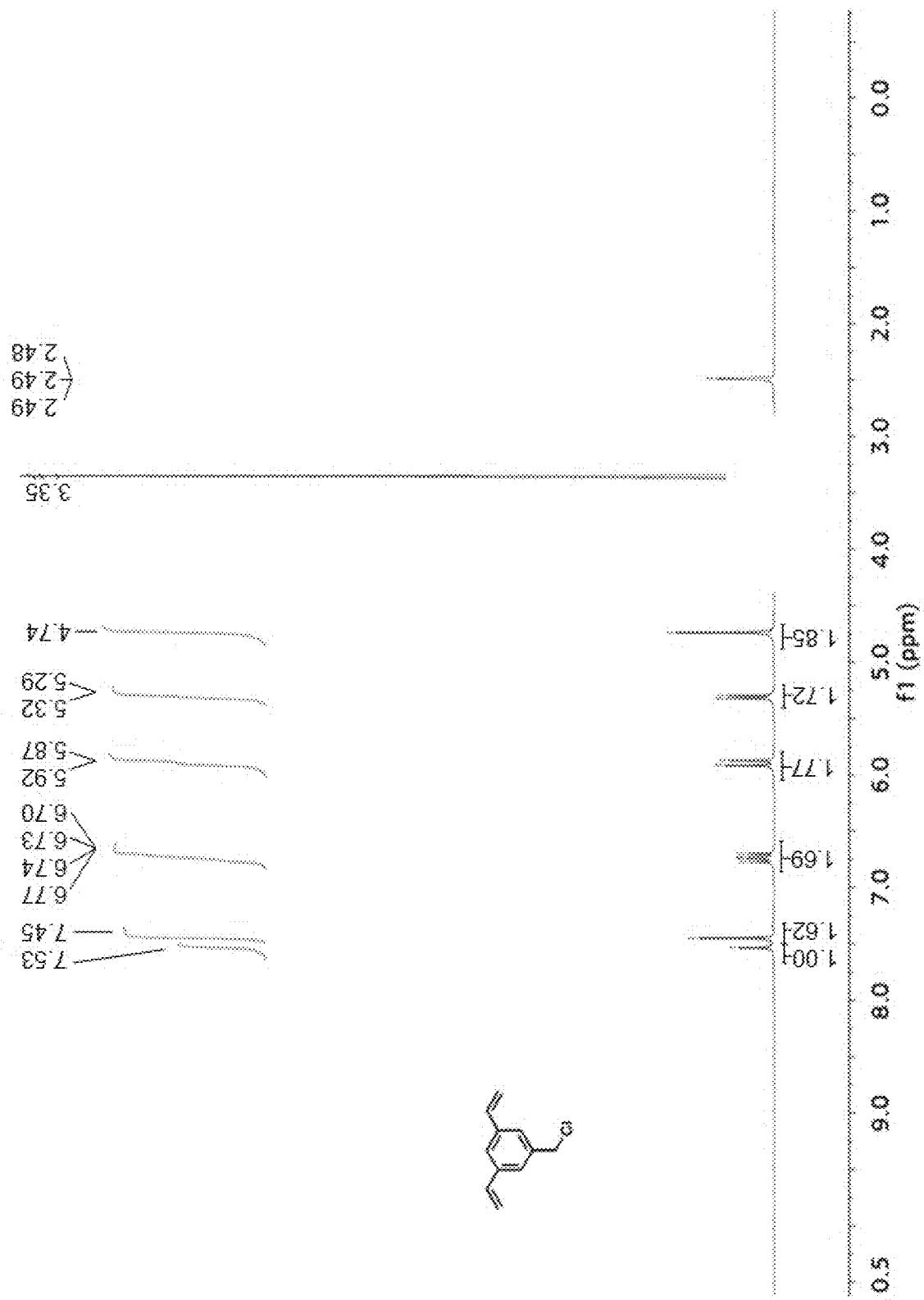

The performance seen for POP-SH in capturing mercury under diverse conditions is due to the strong binding interactions between the thiol group in POP-SH and mercury, confirmed by X-ray photoelectron spectroscopy (XPS) and Raman spectroscopy studies. XPS samples were prepared following a previously reported procedure.[23] The S 2p core level emissions revealed at approximately 168 eV, for pristine POP-SH and POP-SH@Hg. The peak slightly shifts and becomes more symmetrical, compared to POP-SH, which indicates the sulfur was bound to the mercury in POP-SH@Hg. The Hg 4f spectrum has a doublet resulting in $4f_{7/2}$ and $4f_{5/2}$ peaks at 110 and 106 eV, respectively (FIGS. 9A-9C).[24] Additionally, the Raman spectrum of POP-SH@Hg displayed peaks at 276 $cm^{-1}$ and 290 $cm^{-1}$, associated with the Hg—S stretching vibrations (vs=276 $cm^{-1}$ and vas=290 $cm^{-1}$) (FIG. 7) further confirming the coordination between sulfur and mercury.[25]

Figures 4A, 4B:
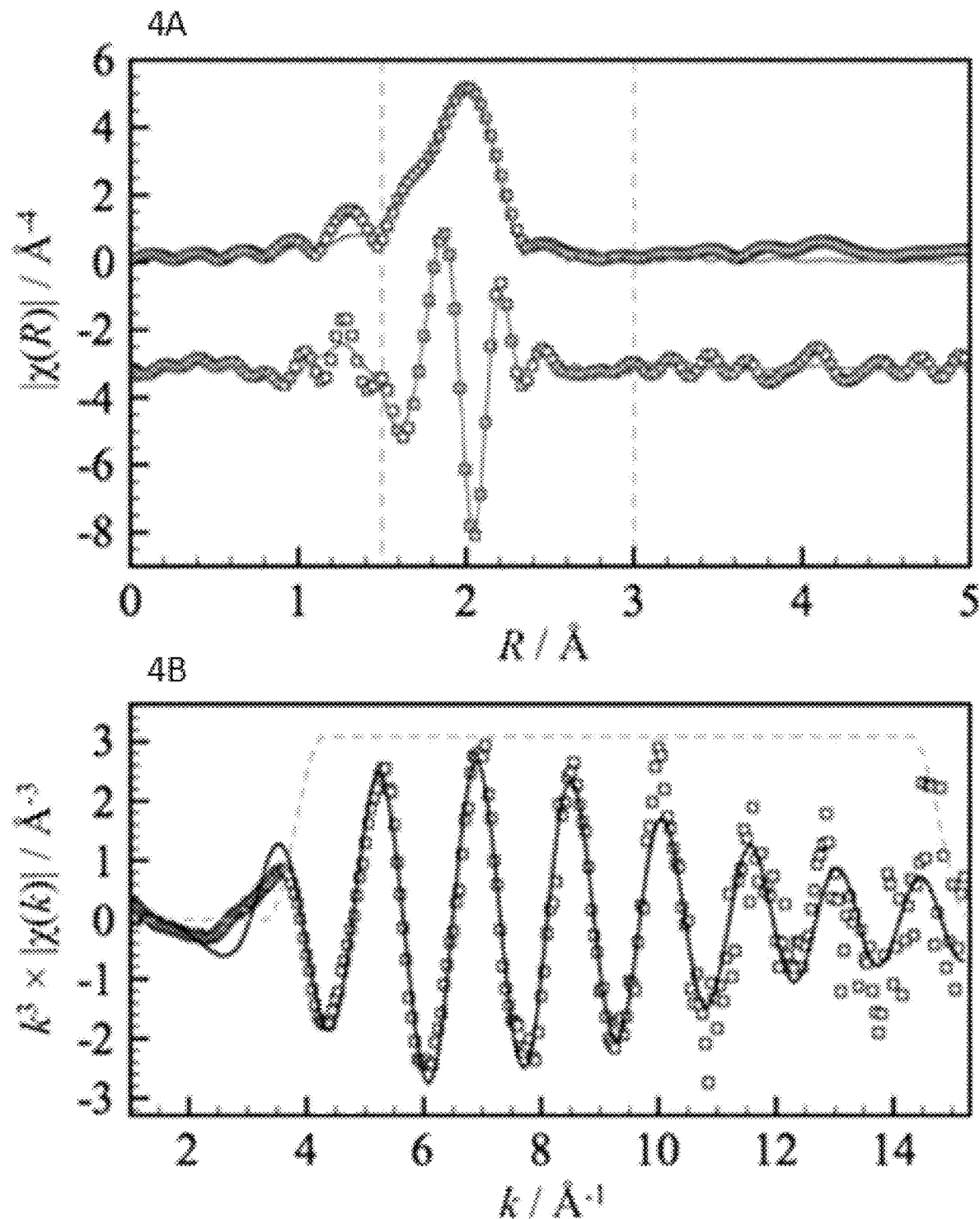
FIGS. 4A-4B show (FIG. 4A) fourier transform of the Hg LIII-edge EXAFS spectrum of POF-SH in R-space fit with two Hg—S scattering paths. The real component and fit are presented below. Dashed lines indicate the fit window.

To achieve further understanding of the mercury-thiol coordination environment within the porous framework, the Hg LIII-absorption edge (12.284 keV) of POP-SH@Hg was analyzed using X-ray absorption fine structure (XAFS) spectroscopy (see Supporting Information for experimental details and data analysis). The fit of the extended XAFS (EXAFS) data obtained for POP-SH@Hg is shown in FIG. 4A-4B. Importantly, fits to Hg—O[26] and Hg—Cl were significantly inferior to Hg—S models which suggests neither precipitation of HgO nor non-specific adsorption of the Hg starting material occurs. Two Hg—S scattering paths were required, with 69% and 31% contribution at 2.37 Å and 2.26 Å, respectively, providing the best fit for POP-SH@Hg. A multimodal distribution of Hg—S distances is anticipated for an amorphous material with a rigid polymeric backbone in conjunction with flexible benzyl thiols. The cooperative interplay of the variation in structural constraints contributes to the overall robustness of POP-SH and its high mercury adsorption capacity.

CONCLUSION

This study explored the use of a functional porous organic polymer, POP-SH, for its ability to remove mercury for environmental remediation purposes. POP-SH demonstrated exceptionally high $Hg^0$ and $Hg^{2+}$ uptake capacities of 630 and 1216 mg $g^{-1}$, respectively. Efficient mercury removal was rapid due to the hierarchical pore structure and readily available thiol groups, which resulted in high concentrations of mercury being reduced to ppb level within minutes. Furthermore, POP-SH was fully recyclable, stable at a broad pH range, and highly selective for mercury in the presence of other cations. These results demonstrate the feasibility of POPs as adsorbent materials for heavy metal capture in several applications from wastewater run-off to industrial flue gas.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

REFERENCES

[1] a) C. J. Vorosmarty, P. B. McIntyre, M. O. Gessner, D. Dudgeon, A. Prusevich, P. Green, S. Glidden, S. E. Bunn, C. A. Sullivan, C. R. Liermann, P. M. Davies, Nature 2010, 467, 555; b) M. A. Mallin, L. B. Cahoon, Population Environ. 2003, 24, 369; c) M. Kampa, E. Castanas, Proceedings of the 4th International Workshop on Biomonitoring of Atmospheric Pollution (With Emphasis on Trace Elements) 2008, 151, 362; d) J. T. Kerr, D. J. Currie, Conservation Bio. 1995, 9, 1528; e) Q. Ma, Y. Yu, M. Sindoro, A. G. Fane, R. Wang, H. Zhang, Adv. Mater. 2017, 1605361.

[2] UNEP, (Ed: U. C. Branch), Geneva, Switzerland 2013.

[3] a) B. Allard, I. Arsenie, Water Air Soil Pollut. 1991, 56, 457; b) C. Brosset, Water Air Soil Pollut. 1981, 16, 253; c) R. P. Mason, G. R. Sheu, Glob. Biogeochem. Cycles 2002, 16.

[4] a) M. McNutt, Science 2013, 341, 1430; b) F. Zahir, S. J. Rizwi, S. K. Haq, R. H. Khan, Environ. Toxicol. Pharmacol. 2005, 20, 351.

[5] a) D. Malakoff, Science 2013, 341, 1442; b) T. K. Mackey, J. T. Contreras, B. A. Liang, Sci. Total Environ. 2014, 472, 125; c) H. Selin, Global Environ. Politics 2014, 14, 1.

[6] E. Cohen, H. Weissman, E. Shimoni, I. Kaplan-Ashiri, K. Werle, W. Wohlleben, B. Rybtchinski, Angew. Chem. Int. Ed. 2017, 56, 2203.

[7] M. C. Dujardin, C. Cazé, I. Vroman, React. Funct. Polym. 2000, 43, 123.

[8] a) R. G. Pearson, J. Am. Chem. Soc. 1963, 85, 3533; b) S.-Y. Ding, M. Dong, Y.-W. Wang, Y.-T. Chen, H.-Z. Wang, C.-Y. Su, W. Wang, J. Am. Chem. Soc. 2016, 138, 3031.

[9] A. J. Tchinda, E. Ngameni, I. T. Kenfack, A. Walcarius, Chem. Mater. 2009, 21, 4111.

[10] a) W. Kicinski, M. Szala, M. Bystrzejewski, Carbon 2014, 68, 1; b) Y. Shin, G. E. Fryxell, W. Um, K. Parker, S. V. Mattigod, R. Skaggs, Adv. Funct. Mater. 2007, 17, 2897.

[11] a) A. Bibby, L. Mercier, Chem. Mater. 2002, 14, 1591; b) S. J. L Billinge, E. J. McKimmy, M. Shatnawi, H. Kim, V. Petkov, D. Wermeille, T. J. Pinnavaia, J. Am. Chem. Soc. 2005, 127, 8492; c) P. I. Girginova, A. L. Daniel-Da-Silva, C. B. Lopes, P. Figueira, M. Otero, V. S. Amaral, E. Pereira, T. Trindade, J. Colloid Interface Sci. 2010, 345, 234; d) O. Hakami, Y. Zhang, C. J. Banks, Water Res. 2012, 46, 3913; e) A. Walcarius, L. Mercier, J. Mater. Chem. 2010, 20, 4478; f) X. Feng, G. E. Fryxell, L. Q. Wang, A. Y. Kim, J. Liu, K. M. Kemner, Science 1997, 276, 923.

[12] D. M. Saad, E. M. Cukrowska, H. Tutu, Appl. Water Sci. 2013, 3, 527.

[13] a) H. Wang, B. Khezri, M. Pumera, Chem 2016, 1, 473; b) J.-G. Yu, B.-Y. Yue, X.-W. Wu, Q. Liu, F.-P. Jiao, X.-Y. Jiang, X.-Q. Chen, Environ. Sci. Pollut. Res. 2016, 23, 5056; c) L. Mercier, T. J. Pinnavaia, Adv. Mater. 1997, 9, 500; d) J. Liu, X. Feng, G. E. Fryxell, L.-Q. Wang, A. Y. Kim, M. Gong, Adv. Mater. 1998, 10, 161; e) C. Kar, M. D. Adhikari, A. Ramesh, G. Das, RSC Adv. 2012, 2, 9201; f) K. Ai, C. Ruan, M. Shen, L. Lu, Adv. Funct. Mater. 2016, 26, 5542; g) C. W. Abney, J. C. Gilhula, K. Lu, W. Lin, Adv. Mater. 2014, 26, 7993; h) M. J. Manos, V. G. Petkov, M. G. Kanatzidis, Adv. Funct. Mater. 2009, 19, 1087; i) S. Bag, P. N. Trikalitis, P. J. Chupas, G. S. Armatas, M. G. Kanatzidis, Science 2007, 317, 490; j) M. J. Manos, M. G. Kanatzidis, Chem. Eur. J. 2009, 15, 4779.

[14] a) Q.-R. Fang, D.-Q. Yuan, J. Sculley, J.-R. Li, Z.-B. Han, H.-C. Zhou, Inorg. Chem. 2010, 49, 11637; b) F. Luo, J. L. Chen, L. L. Dang, W. N. Zhou, H. L. Lin, J. Q. Li, S. J. Liu, M. B. Luo, J. Mater. Chem. A 2015, 3, 9616; c) M. Mon, F. Lloret, J. Ferrando-Soria, C. Marti-Gastaldo, D. Armentano, E. Pardo, Angew. Chem. Int. Ed. 2016, 55, 11167; d) X.-P. Zhou, Z. Xu, M. Zeller, A. D. Hunter, Chem. Commun. 2009, 5439; e) K.-K. Yee, N. Reimer, J. Liu, S.-Y. Cheng, S.-M. Yiu, J. Weber, N. Stock, Z. Xu, J. Am. Chem. Soc. 2013, 135, 7795; f) Q. Sun, B. Aguila, J. Perman, L. Earl, C. Abney, Y. Cheng, H. Wei, N. Nguyen, L. Wojtas, S. Ma, J. Am. Chem. Soc. 2017, 139, 2786; g) N. Huang, L. Zhai, H. Xu, D. Jiang, J. Am. Chem. Soc. 2017, 139, 2428.

[15] a) P. Zhang, H. Li, G. M. Veith, S. Dai, Adv. Mater. 2015, 27, 234; b) L.-B. Sun, X.-Q. Liu, H.-C. Zhou, Chem. Soc. Rev. 2015, 44, 5092; c) A. Thomas, Angew. Chem. Int. Ed. 2010, 49, 8328; d) B. Alsbaiee, J. Smith, L. Xiao, Y. Ling, D. E. Helbling, W. R. Dichtel, Nature 2016, 529, 190; e) J. M. Thomas, A. Trewin, J. Phys. Chem. C 2014, 118, 19712; f) Y. Du, H. Yang, J. M. Whiteley, S. Wan, Y. Jin, S.-H. Lee, W. Zhang, Angew. Chem. Int. Ed. 2016, 55, 1737; g) G. W. Peterson, O. K. Farha, B. Schindler, P. Jones, J. Mahle, J. T. Hupp, J. Porous Mater. 2012, 19, 261; h) Y. Zeng, R. Zou, Y. Zhao, Adv. Mater. 2016, 28, 2855; i) C. Pei, T. Ben, S. Qiu, Mater. Horiz. 2015, 2, 11; j) Q. Lin, X. Bu, A. Kong, C. Mao, F. Bu, P. Feng, Adv. Mater. 2015, 27, 3431; k) J.-X. Jiang, F. Su, A. Trewin, C. D. Wood, H. Niu, J. T. A. Jones, Y. Z. Khimyak, A. I. Cooper, J. Am. Chem. Soc. 2008, 130, 7710; l) X. Zhuang, D. Gehrig, N. Forler, H. Liang, M. Wagner, M. R. Hansen, F. Laquai, F. Zhang, X. Feng, Adv. Mater. 2015, 27, 3789; m) J.-X. Jiang, F. Su, A. Trewin, C. D. Wood, N. L. Campbell, H. Niu, C. Dickinson, A. Y. Ganin, M. J. Rosseinsky, Y. Z. Khimyak, A. I. Cooper, Angew. Chem. Int. Ed. 2007, 46, 8574; n) Z. Xiang, D. Cao, L. Huang, J. Shui, M. Wang, L. Dai, Adv. Mater. 2014, 26, 3315; o) J. R. Hoist, A. I. Cooper, Adv. Mater. 2010, 22, 5212; p) X. Feng, L. Chen, Y. Honsho, O. Saengsawang, L. Liu, L. Wang, A. Saeki, S. Irle, S. Seki, Y. Dong, D. Jiang, Adv. Mater. 2012, 24, 3026; q) A. I. Cooper, Adv. Mater. 2009, 21, 1291; r) M. H. Weston, O. K. Farha, B. G. Hauser, J. T. Hupp, S. T. Nguyen, Chem. Mater. 2012, 24, 1292.

[16] B. Y. Li, Y. M. Zhang, D. X. Ma, Z. Shi, S. Q. Ma, Nat. Commun. 2014, 5, 5537.

[17] E. Pretsch, P. Bühlmann, C. Affolter, E. Pretsch, P. Bhuhlmann, C. Affolter, Structure determination of organic compounds, Springer, 2009.

[18] C. A. Szafranski, W. Tanner, P. E. Laibinis, R. L Garrell, Langmuir 1998, 14, 3570.

[19] a) P. S. Kalsi, Spectroscopy of organic compounds, New Age International, 2007; b) J. C. Ma, D. A. Dougherty, Chem. Rev. 1997, 97, 1303.

[20] Table of Regulated Drinking Water Contaminants, https://www.epa.gov/ground-water-and-drinking-water/table-regulated-drinking-water-contaminants, accessed: 2016.

[21] W. Plazinski, J. Dziuba, W. Rudzinski, Adsorption 2013 19, 1055.

[22] a) Y. J. Xie, B. Yan, C. Tian, Y. X. Liu, Q. X. Liu, H. B. Zeng, J. Mater. Chem. A 2014, 2, 17730; b) X. Q. Wang, P. Wang, P. Ning, Y. X. Ma, F. Wang, X. L. Guo, Y. Lan, RSC Adv. 2015, 5, 24899; c) J. V. Nabais, P. J. M. Carrott, M. M. L. R. Carrott, M. Belchior, D. Boavida, T. Diall, I. Gulyurtlu, Appl. Surf. Sci. 2006, 252, 6046; d) L. L. Zhao, Q. Y. Liu, J. Wu, C. Zhang, Y. Wu, J. M. Zha, S. Y. Yang, C. Z. Hu, in Environmental Engineering, Pts 1-4, Vol. 864-867 (Eds: H. Li, Q. Xu, H. Ge) 2014, p. 1519; e) K. Balasundaram, M. Sharma, RSC Adv. 2015, 5, 73868.

[23] R. Elzein, C.-M. Chang, I. Ponomareva, W.-Y. Gao, S. Ma, R. Schlaf, ACS Appl. Mater. Interfaces 2016, 8, 31403.

[24] a) J. F. Moulder, J. Chastain, Handbook of X-ray Photoelectron Spectroscopy: A Reference Book of Standard Spectra for Identification and Interpretation of XPS Data, Physical Electronics, 1995; b) G. Marimuthu, M. Arivanandhan, C. Vedhi, Synthesis and Reactivity in Inorganic, Metal-Organic, and Nano-Metal Chemistry 2015.

[25] G. G. Hoffmann, W. Brockner, I. Steinfatt, Inorg. Chem. 2001, 40, 977.

[26] Chen, E. J. McKimmy, T. J. Pinnavaia, K. F. Hayes, Environ. Sci. Technol. 2004, 38, 4758.

[27] Q. Sun, Z. Dai, X. Liu, N. Sheng, F. Deng, X. Meng, F.-S. Xiao, J. Am. Chem. Soc. 2015, 137, 5204.

[28] S. H. Yoon, J. Shin, H. A. Um, T. W. Lee, M. J. Cho, Y. J. Kim, Y. H. Son, J. H. Yang, G. Chae, J. H. Kwon, D. H. Choi, Journal of Polymer Science Part A: Polymer Chemistry 2014, 52, 707.

[29] B. Y. Li, Y. M. Zhang, D. X. Ma, Z. Shi, S. Q. Ma, Nature Communications 2014, 5.

[30] X. Feng, G. E. Fryxell, L. Q. Wang, A. Y. Kim, J. Liu, K. M. Kemner, Science 1997, 276, 923.

[31] S. Bag, P. N. Trikalitis, P. J. Chupas, G. S. Armatas, M. G. Kanatzidis, Science 2007, 317, 490.

[32] K.-K. Yee, N. Reimer, J. Liu, S.-Y. Cheng, S.-M. Yiu, J. Weber, N. Stock, Z. Xu, Journal of the American Chemical Society 2013, 135, 7795.

[33] Y. Shin, G. E. Fryxell, W. Um, K. Parker, S. V. Mattigod, R. Skaggs, Advanced Functional Materials 2007, 17, 2897.

[34] M. J. Manos, V. G. Petkov, M. G. Kanatzidis, Advanced Functional Materials 2009, 19, 1087.

[35] M. J. Manos, M. G. Kanatzidis, Chemistry—A European Journal 2009, 15, 4779.

[36] Q. Sun, B. Aguila, J. Perman, L. D. Earl, C. W. Abney, Y. Cheng, H. We, N. Nguyen, L. Wojtas, S. Ma, Journal of the American Chemical Society 2017, 139, 2786.

[37] K. Ai, C. Ruan, M. Shen, L. Lu, Advanced Functional Materials 2016, 26, 5542.

[38] C. W. Abney, J. C. Gilhula, K. Lu, W. Lin, Adv. Mater. 2014, 26, 7993.

[39] N. Huang, L. Zhai, H. Xu, D. Jiang, Journal of the American Chemical Society 2017, 139, 2428.

[40] S. M. Webb, Physica Scripta 2005, T115, 1011.

[41] B. Ravel, M. Newville, *Journal of Synchrotron Radiation* 2005, 12, 537; J. J. Rehr, R. C. Albers, *Reviews of Modern Physics* 2000, 72, 621.

[42] S. Calvin, XAFS for Everyone, CRC Press, Boca Raton, Fla. 2013; S. D. Kelly, K. M. Kemner, J. B. Fein, D. A. Fowle, M. I. Boyanov, B. A. Bunker, N. Yee, *Geochimica et Cosmochimica Acta* 2002, 66, 3855.

We claim:

1. A composition for binding mercury, the composition comprising a porous organic polymer (POP) comprising:
   (i) a plurality of repeat units having a structure according to the formula —$CH_2A^1CH_2$— where $A^1$ is a conjugated core having one or more heavy metal chelator moieties covalently attached thereto; and
   (ii) a plurality of pores having a hierarchical pore size distribution over a range of pore sizes.

2. The composition according to claim 1, wherein $A^1$ comprises from 1 to 3 substituted phenyl rings that can be fused or non-fused.

3. The composition according to claim 1, wherein $A^1$ is selected from the group consisting of substituted phenyl, substituted biphenyl, substituted terphenyl, substituted naphthalene, and substituted anthracene.

4. A composition for binding mercury, the composition comprising a porous organic polymer (POP) comprising:
   (i) a plurality of repeat units each having a structure according to any one of Formula 1A-Formula 1C

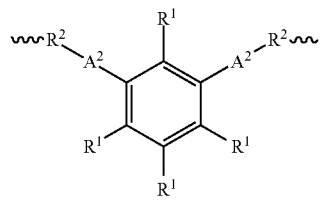

Formula 1A

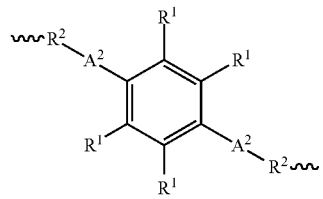

Formula 1B

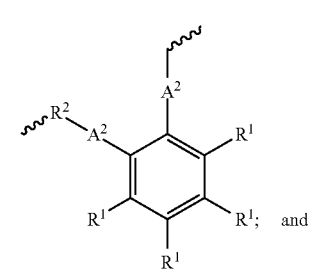

Formula 1C (ii) a plurality of pores having a hierarchical pore size distribution over a range of pore sizes;
   where each occurrence of $R^1$ is independently —$R^3A^3$, a hydrogen, or an alkyl or heteroalkyl having 1 to 3 carbon atoms so long as at least one occurrence of $R^1$ is —$R^3A^3$;
   where each occurrence of $R^2$ is independently an alkyl having 1 to 3 carbon atoms;
   where each occurrence of $R^3$ is independently none or a substituted or unsubstituted alkyl or heteroalkyl having 1 to 5 carbon atoms;
   where each occurrence of $A^2$ is independently none or a substituted or unsubstituted phenyl; and
   where each occurrence of $A^3$ is a heavy metal chelator moiety.

5. The composition according to claim 4, wherein the repeat units in the plurality of repeat units each have a structure according to any one of Formula 2A-Formula 2C

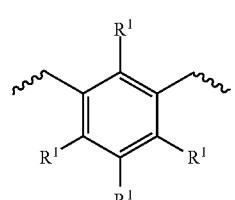

Formula 2A

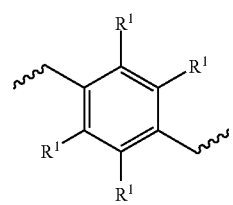

Formula 2B

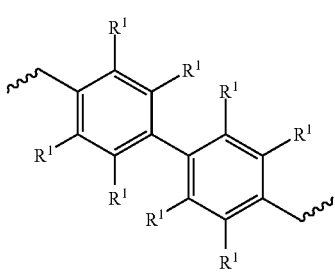

Formula 2C where $R^1$ is as defined above.

6. The composition according to claim 4, wherein the range of pore sizes is at least 5 nm, at least 8 nm, or at least 10 nm.

7. The composition according to claim 4, wherein the range of pore sizes is about 5 nm to 10 nm.

8. The composition according to claim 4, wherein the hierarchical pore size distribution is determined based upon at least 60% of the pore sizes in the range of pore sizes having a pore volume of at least 0.01 cm$^3$ g$^{-1}$ in the pore size distribution,
   wherein the pore size distribution is based on a non-local density functional theory model applied to a nitrogen adsorption isotherm for the POP measured at 77 K.

9. The composition according to claim 8, wherein the range of pore sizes is about 1 nm to about 10 nm; and
   wherein at least 80% of the pore sizes in the pore size distribution have a pore volume of at least 0.01 cm$^3$ g$^{-1}$.

10. The composition according to claim 4, wherein each occurrence of the heavy metal chelator moiety is selected from the group consisting of a thiol, a sulfide, an amine, and a pyridine moiety.

11. The composition according to claim 1, wherein the repeat units in the plurality of repeat units each have a structure according to the following formula

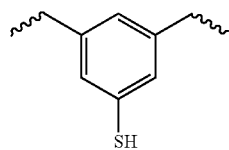

5

12. The composition according to claim 4, wherein the composition has a maximum mercury uptake capacity of 1,000 mg g$^{-1}$ to 2,000 mg g$^{-1}$ at 1 atm and 296 K.

13. The composition according to claim 4, wherein the composition has a distribution coefficient for the heavy metal of $1\times10^8$ mL g$^{-1}$ to $1\times10^9$ mL g$^{-1}$.

14. The composition according to claim 4, wherein the composition attains at least 90% of the equilibrium adsorption capacity in less than 10 minutes when placed in an aqueous solution containing the mercury.

15. The composition according to claim 4, wherein the composition has a mercury uptake capacity that is stable and recyclable.

16. The composition according to claim 4, wherein the porous organic polymer is stable under basic conditions.

17. The composition according to claim 4, wherein the porous organic polymer has a surface area from 1,000 m$^2$/g to 8,000 m$^2$/g.

* * * * *